United States Patent
Huffa et al.

(10) Patent No.: US 11,560,653 B2
(45) Date of Patent: Jan. 24, 2023

(54) METHOD FOR MANUFACTURING FOOTWEAR ARTICLES

(71) Applicant: Fabdesigns, Inc., Malibu, CA (US)

(72) Inventors: Bruce Huffa, Encino, CA (US); Concetta Maria Huffa, Encino, CA (US)

(73) Assignee: Fabdesigns, Inc., Malibu, CA (US)

( * ) Notice: Subject to any disclaimer, the term of this patent is extended or adjusted under 35 U.S.C. 154(b) by 0 days.

(21) Appl. No.: 17/519,851

(22) Filed: Nov. 5, 2021

(65) Prior Publication Data

US 2022/0127765 A1 Apr. 28, 2022

Related U.S. Application Data

(62) Division of application No. 16/400,933, filed on May 1, 2019, now Pat. No. 11,168,416.

(Continued)

(51) Int. Cl.
*D04B 1/24* (2006.01)
*A43B 1/14* (2006.01)
*A43B 23/02* (2006.01)

(52) U.S. Cl.
CPC .............. *D04B 1/24* (2013.01); *A43B 1/14* (2013.01); *A43B 23/025* (2013.01); *D10B 2501/043* (2013.01)

(58) Field of Classification Search
CPC ... D04B 1/24; D04B 7/30; D04B 7/04; D04B 7/10; D04B 7/045; A43B 1/14;

(Continued)

(56) References Cited

U.S. PATENT DOCUMENTS

| | | | |
|---|---|---|---|
| 1,712,344 | A | 5/1929 | Graeber |
| 1,828,533 | A | 10/1931 | Hoffmann |

(Continued)

FOREIGN PATENT DOCUMENTS

| | | |
|---|---|---|
| DE | 3937406 | 5/1991 |
| DE | 4439907 | 5/1996 |

(Continued)

OTHER PUBLICATIONS

Gupta, B.S., and M. Afshari, "Tensile Failure of Polyacrylonitrile Fibers." Handbook of Tensile Properties of Textile and Technical Fibres, Woodhead Publishing, Mar. 27, 2014, www.sciencedirect.com/science/article/pii/B978184569387950014X?via%3Dihub. (Year: 2014).

*Primary Examiner* — Danny Worrell
(74) *Attorney, Agent, or Firm* — Garson & Gutierrez, PC

(57) ABSTRACT

Systems and methods for manufacturing knitted shoe uppers. An article of fully finished three-dimensionally weft knitted footwear is manufactured through a knitting process which can be performed by an automated V-bed flat knitting machine. The knitting process includes manipulating one or more double-knit stitch types and joining the stitches exclusively in the knitting process to create a seamless upper to fit a foot. A resulting upper advantageously has no sewn seams and requires no manual post process to cut or sew the upper to create the dimensional shape. The process creates a seamless, full gauge, dimensionally stable footwear upper, as a unitary textile construction with an integrated anatomically appropriate heel. The entire upper, including the closure element of the upper, may be completed exclusively by the knitting machine, ready for the following shoe making process.

20 Claims, 29 Drawing Sheets

Related U.S. Application Data

(60) Provisional application No. 62/665,929, filed on May 2, 2018.

(58) Field of Classification Search
CPC ...... A43B 23/025; A43B 1/04; D10B 23/025; D10B 1/14
See application file for complete search history.

(56) References Cited

U.S. PATENT DOCUMENTS

| | | |
|---|---|---|
| 2,294,916 A | 9/1942 | Kretser |
| RE24,737 E | 11/1959 | Bolles et al. |
| 3,733,856 A | 5/1973 | Masahiro |
| 3,859,824 A | 1/1975 | Krylov et al. |
| 3,992,903 A | 11/1976 | Janda et al. |
| 4,122,555 A | 10/1978 | Safrit et al. |
| 4,237,706 A | 12/1980 | Patthey |
| 4,748,078 A | 5/1988 | Doi et al. |
| 5,517,832 A | 5/1996 | Kristensen |
| 5,615,562 A | 4/1997 | Roell |
| 6,854,200 B2 | 2/2005 | Hipp et al. |
| 6,986,269 B2 | 1/2006 | Dua |
| 8,448,474 B1 | 5/2013 | Tatler et al. |
| 8,973,410 B1 | 3/2015 | Podhajny |
| 9,149,086 B2 | 10/2015 | Greene et al. |
| 9,226,540 B2 | 1/2016 | Podhajny |
| 9,549,591 B2 | 1/2017 | Uchikawa et al. |
| 9,661,892 B2 | 5/2017 | Meir |
| 9,771,673 B2 | 9/2017 | Ikenaka et al. |
| 9,976,236 B2 | 5/2018 | Terai et al. |
| 10,233,574 B2 | 3/2019 | Wan et al. |
| 10,294,591 B2 | 5/2019 | Podhajny et al. |
| 10,683,594 B2 | 6/2020 | Li et al. |
| 10,753,019 B2 | 8/2020 | Berrian et al. |
| 11,168,416 B2 * | 11/2021 | Huffa ................... D04B 1/108 |
| 2014/0134378 A1 | 5/2014 | Downs et al. |
| 2016/0029736 A1 | 2/2016 | Meir |
| 2016/0075061 A1 | 3/2016 | Waas et al. |
| 2016/0369436 A1 | 12/2016 | Stewart et al. |
| 2017/0176146 A1 | 6/2017 | Bohringer et al. |
| 2018/0002133 A1 | 1/2018 | Stewart et al. |
| 2018/0055145 A1 | 3/2018 | Aristizabal et al. |
| 2018/0184755 A1 | 7/2018 | Yumiba et al. |
| 2018/0303204 A1 | 10/2018 | Woodard |
| 2018/0343956 A1 | 12/2018 | Li et al. |
| 2018/0343973 A1 | 12/2018 | Hancock |
| 2019/0153639 A1 | 5/2019 | Nishigaki |
| 2019/0203389 A1 | 7/2019 | Liu |
| 2019/0231021 A1 | 8/2019 | Hoying et al. |
| 2019/0233988 A1 | 8/2019 | Harada et al. |
| 2019/0328075 A1 | 10/2019 | Poulsen et al. |

FOREIGN PATENT DOCUMENTS

| | | |
|---|---|---|
| EP | 0061975 | 10/1982 |
| EP | 0526406 | 2/1993 |
| EP | 1298239 | 2/2003 |
| EP | 2960362 | 12/2013 |
| EP | 3412814 | 12/2018 |
| EP | 3569750 | 11/2019 |
| FR | 598096 | 4/1925 |
| FR | 2149520 | 8/1972 |
| GB | 720687 | 12/1954 |
| GB | 2214939 | 9/1989 |
| TW | M547866 U | 1/2017 |
| WO | WO2010142608 | 12/2010 |
| WO | WO2011043998 | 4/2011 |
| WO | WO2015134648 | 9/2015 |
| WO | WO2016144971 | 9/2016 |

* cited by examiner

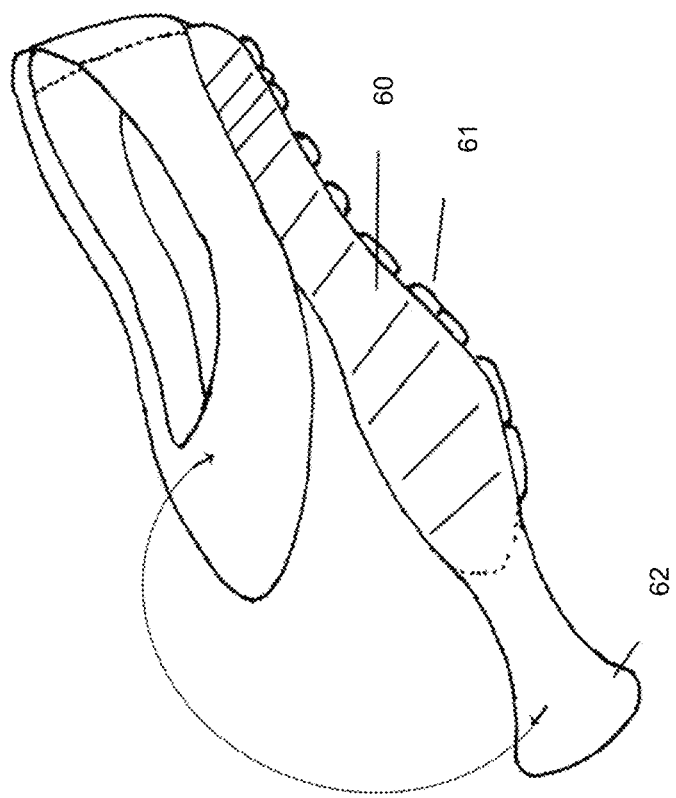

METHOD FOR MANUFACTURING FOOTWEAR ARTICLES

PRIORITY

This application is a divisional of, and claims the benefit of priority to, U.S. patent application Ser. No. 16/400,933 filed May 1, 2019, of the same title, which claims the benefit of priority to U.S. Provisional Patent Application Ser. No. 62/665,929 filed May 2, 2018 and entitled "METHOD FOR KNITTING A SHOE UPPER", the contents of each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

Embodiments of the present disclosure relate generally to footwear manufacturing, and more specifically, to the field of knitting mechanisms for manufacturing footwear uppers.

2. Description of Related Technology

Frequently, a fabric or a textile is used as a shoe upper of an athletic shoe, a casual shoe, sandal, or other type of shoe with a structural requirement to hold a foot to the sole. A textile may be defined as any manufacture from fibers, filaments, or yarns characterized by flexibility, fineness, and a high ratio of length to thickness. The materials forming the upper may be selected based upon the properties of wear-resistance, flexibility, stretch, and air-permeability, for example.

The shoe upper may be formed by a method of cutting and sewing, and therefore cut from numerous fabric material elements, which each may impart different properties to specific portions of the upper. This cutting and sewing method creates considerable waste, that may or may not be able to be recycled.

In the shoe manufacturing process, it is generally desirable to minimize the number and types of materials in the article of footwear, particularly athletic footwear. Using fewer materials reduces costs and increases efficiency, given that shoe manufacture is a labor-intensive process. A typical shoe manufacturing process encompasses the steps of selecting the material, cutting the upper material components to shape, reducing the thickness of the joining edges ("skiving") for leather or synthetic leather, reducing the thickness of the upper pieces ("splitting"), laminating by adhesive or glue the interlining to the upper pieces ("interlining"), forming the eyelets, grommet the eyelets if required by the design, stitching the upper pieces together, shaping the upper over a last ("lasting"), sewing the edges of the upper, stitching ("Strobeling") the upper to a liner ("insole lining"), front part molding of the upper on the last, back part molding of the upper on the last, molding or sewing the bottom of the shoes to the upper ("bottoming"), and setting the materials and adhesives in a heat tunnel. Modern footwear designs, principally athletic shoe designs, require numerous upper pieces and complicated manufacturing steps, leading to high labor costs, lengthy time frames for sourcing materials, fabric compatibility issues, seam compatibility issues, and production waste in the cutting process. Combining separate materials into a cut and sew type upper involves multiple distinct manufacturing stages requiring multiple labor actions and activities. Employing a plurality materials and seams, in addition to a plurality of textiles, may also make the footwear heavier, less comfortable, and less anatomically functional.

Conventional knitted footwear uppers have seams, typically at the heel, at medical arch, or at other places on the foot. Seams create undesirable pressure points on the foot, resulting in blisters and other irritations as well as potential structural failure points. Conventional knitted footwear created without seams, are typically sock-like jersey-based fabrics, which require additional reinforcement materials to be applied to the upper to stabilize the skewing jersey fabric. Adding additional materials, internally and or externally, requires sourcing, purchasing, color matching, warehousing the materials, then cutting, scrapping waste, creating sub-assemblies, bundling, coordinating, and applying the materials in one or more locations post processes. The potentials for error and scrap waste in each step are substantial.

Conventional knitting of footwear uppers which are shaped using current double-bed seamless fabrications fit poorly, due to the limitations of the currently used short rowing technique to create an angled heel. It usually results in an acute heel angle that is less than anatomically appropriate. FIG. 1A is a diagram demonstrating the parts and angle of a normal heel on a human foot as compared to its sole and or a flat surface. FIG. 1B is a diagram of the grain lines of the heel and body of a seamless article of footwear produced on a two-needle-bed knitting machine with double bed fabric using short rowing according to the conventional art. FIG. 1C is a loop diagram of the heel area of a knitted to shape three-dimensional semi-finished textile upper using short rowing according to the conventional art. 31 in FIG. 1C shows acute heel angle results from short row loops.

A less than appropriate heel angle may dramatically affect fit and comfort by creating pressure, pain, inflammation, swelling, and discomfort to the soft tissue of the foot including the plantar fascia, heel pad, Achilles tendon, skin of the calcaneal area, as well as other areas of the foot. Such a heel may cause blisters, injury to the skin and Achilles tendon itself, as well as affect gait and expand discomfort to legs, hips, back, and neck. Stiff materials amplify poor fit, especially in the heel area. Washing, sweat, and or accidental wetting of the upper in shoe form, typically contracts the angle further.

Current methods of knitting wire, cables and other spooled aesthetic or reinforcing materials, using standard knitting machinery and standard feed systems have difficulty with unpackaging spools of materials. The strands twist on themselves and cause several issues varying in severity: breakage of the strand, production down time, damaged product, damaged machine parts, including needles, stop motions, knock over verges, sinkers, wires and other costly machine parts. Simple products using one or two strand feeds, that are fed into a standard knitting machine are possible using expensive additional unspooling equipment available from knitting machine manufacturers. However, knitting a more complex structure, using more than two unspooled strand feeds on standard machine builder equipment is currently not possible.

Weft knitting refers to the construction of fabric by feeding yarn and forming loops in the horizontal ("weft") direction. The term "V-bed knitting," "V-bed flat knitting" describes a weft knitting process by feeding yarn and forming loops, with at least two opposing needle beds, where latch needles and other elements are selected and slide during the knitting process, to engage strands of material and thereby create a fabric. FIG. 2A is a diagram of weft knitting, and the horizontal directions by which strands are inserted into fabric and entangled to create 'weft' knit fabric. FIG. 2B is a diagram of latch needles used in weft knitting, engaging the strands, which are inserted into the knitting machine, the fabric technical jersey knit face and technical jersey purl back created on either a front or a rear needle bed. As illustrated in FIG. 2B, there is typically a technical face 24 and a technical back 25 to the fabric, and a grain, indicated by the direction of the loops.

FIG. 3A is a side view diagram of the positioning of the needle beds and latch needles of a two-needle bed flat V-bed knitting machine. In V-bed flat knitting, the needle beds are positioned at an angle resembling a "V." Each V needle bed 3 has a set of needles 4. FIG. 3B is a side view diagram of the positioning of the needle beds and latch needles in a four-needle bed machine, with a two-needle bed flat V-bed and two additional auxiliary beds and transfer points. Four needle bed machines, such as the Shima Seiki Mach2X and the H. Stoll AG & Co. KG 730T, and the 530T Electronic flat knitting machines, have two needle beds 3a with hundreds of needles 4a, and additionally have auxiliary needle beds 5 with hundreds of fashioning points and or needles 6 (or auxiliary needle points). These needles on the auxiliary needle beds 5 correspond to the same spacing and occurrence of needles 4a in the beds below 3a.

FIG. 3C is a side view diagram of the positioning of the needle beds and latch needles of a two-needle bed flat V-bed knitting machine with two additional auxiliary beds and transfer points, yarn rails, yarn feeders, yarn strand cone packages, strands feeding into the machine. During operation, in both the two needle bed machines and the four needle beds machines, strands of material 8 on cones 11 or spools are fed into feeders 10. Several feeders are located on each machine and run along rails 9 that are arranged in a horizontal direction. The strands run through the feeders and are manipulated by the feeders both along the length of a preprogrammed length of the needle beds 3a and in the horizontal (weft) direction. At the same time, the knitting needles operate to interlace of the strands into loops. The resulting fabric 7 exits the machine under the needle beds.

FIG. 3D is a front view diagram of an automated V-bed flat weft knitting machine. The electronic knitting machine 350 can be programmed automatically to select the needles and other elements via the mechanical and or a digital instruction process. Users can shape fabrics and combine yarns on V-Bed flat knitting machines by utilizing many techniques, including: plaiting, intarsia, striping, jacquard, cable, jacquard, welt, fully fashioning, flesage (wedge-knitting), short-rowing, and other techniques.

Conventionally, there are three main approaches to shaping of V-bed weft knitted fabric into a shoe upper: cut and sew, fully-fashioned, and whole garment technique. Cut and sew technique involves cutting fabric (usually roll goods or fabric blocks) and sewing the cut pieces to fashion an upper. FIG. 4A is a diagram of two-dimensional roll goods with two-dimensional footwear upper pattern pieces to be cut and associated waste material in accordance with the conventional art. These semi-finished textile components are made into finished uppers by combining the knitting process and additional finishing processes such as: knitting two-dimensional rectangular textiles, knitted as plain fabric or with a shoe motif, then die cutting to the respective footwear shape, finishing raw edges, and sewing into a complete upper with a seam closing up the heel, toe flex, or medial arch. Cutting creates scrap, and requires readying cut pieces for the production process, including sorting, retarding fraying, coordinating timing, lot matching, and bundling. Undesirably, the cut and sew method generates a significant amount of scrap waste, is labor intensive, and the stitching results in bulky seams.

FIG. 4B is a diagram of a knitted-to-shape three-dimensional footwear upper with one or more knit textures according to a conventional fully-fashioned approach. The fully-fashioned approach knitting semi-finished panels to shape in two or three-dimensions, and then assembling the shaped pieces in a post process.

Seams create potential points of functional failure while also creating potential pressure points on the foot, resulting in blisters and other performance and or user irritations. In the case of knitting radar absorbing materials, carbon fiber, fiber reinforcing materials, stainless steel, polyurethane coated, or other stiff fibers, these potential problems are increased at the seam points.

In the weft-knitting technique, there are various ways developed to reduce seams, which have been applied to knitting footwear uppers into one piece, rather than the typical leather-industry based process of assembling three to five components into an upper. A widely employed manufacturing technique to eliminate seams and increase the likelihood of a left upper matching a right upper, is by knitting the upper design into two-dimensional roll-good fabric (as show in FIG. 4A), cutting around the design, and assembling.

One such hybrid manufacturing method that can reduce seams is knitting a two-dimensionally U-shaped fabric format (fully-fashioned), optionally die cutting the tongue area, finishing raw edges, and sewing into a complete upper with a seam closing up the heel, toe flex, or medial arch. FIG. 4C is a diagram of a knitted to shape two-dimensional footwear upper with one or more knit textures according to a conventional hybrid approach.

Another hybrid technique employed in upper manufacturing is knitting a two-dimensional upper to shape in a butterfly format, as shown in FIG. 4B, and then sewing to close up the heel, toe flex, or medial arch in one or more post processes; knitting three-dimensional seamless, finished unitary upper construction with integrated components, and sewing to close up the heel, toe flex, or medial arch in one or more post processes.

Shaping courses in textile knitting and in the fully-fashioned uppers described above (FIGS. 4B and 4C) is achieved with: short-rowing, adding or dropping needles, transferring stitches, holding stitches on an alternate needle bed, with needles or fashion points and relocating them to a new position. Fully fashioning an upper saves considerable material, but the fully-fashioned upper still requires a post process to finish the upper to be ready for the shoe making process.

In fashioning an upper on a two-needle bed flat knitting machine, a typical wedge knitting (or short rowing) technique is used to turn the heel grain (as shown in FIG. 1C), and other portions of the upper, such as the toe, instep, and ankle area. However, the fabric shaping on two-needle bed machines by using short row knitting (31 in FIG. 1C) is limited by: increasing or decreasing by one needle wide, by one needle high at a time, and consequently creating an acute angle which is subject to variations in materials. Short-rowing cannot make a right angle. Increasing or decreasing by more than one needle wide by one needle high creates stress on the knitting strand and the knitting needles in pulling a long loop (as shown by 31 in FIG. 1C), which spans a space two or more times longer and wider, than the original loop. The result is a fail in knitting and or a high stress fault line in the fabric that may not endure abrasion, tensile stretch and recovery, or the shoe making process. Opacity may also be an issue with stretching loops farther than one stitch width at a time. Utilizing this short rowing technique creates a semifinished upper (as shown in FIG. 4B), which requires a seam to join the sides to complete the upper's shape.

Seamless double-bed knitted uppers can be created by knitting the aforementioned short rowing technique. FIG. 4D is a loop diagram showing the heel area of a seamless article of footwear produced on a two-needle-bed knitting machine with double bed fabric using the short rowing technique. Shaping typically starts at the heel, which limits the angle 36 of the heel to between thirty-five and seventy degrees, much smaller than the approximate ninety degrees from the body of the upper (which is the horizontal orientation when the footwear is worn by a user), as indicated by the direction of upper short row grains 35 and the direction of the heel short row grains 36. Depending upon the material qualities, the angle of the heel and other areas of current double bed uppers are limited by mechanical transferring constraints of two-bed flat-knitting machinery, and also the structure of double bed fabrics in general.

Utilizing short rowing, there is no transfer of double-bed fabric loops, only the addition of new rows of loops in a wedge like shape (as shown in FIG. 4D), which is a standard and historically used weft-knitting technique. Unfortunately, short rowing technique distorts the fabric grain on an angle. The accuracy of repeating the angle is subject to many variations including: material qualities, dye content of yarns, elasticity of yarn, size of yarn strand, tightness of the stitches, calibration of the machine, and other factors affecting material and machine consistency. The short row angle is limited by one needle in the X direction and by one needle in the Y direction, as described above. Moving more than that may stretch loops and create potential failure points.

FIG. 5 is a technical loop diagram of transferring techniques used in half-gauge tubular knitting to widen a tube on a flat knitting machine. Knitting tubes is another standard and historical technique for weft knitting uppers, which has been utilized on both circular weft-knitting machines and flat V-bed knitting. Sock-like seamless tube structures created on modern V-bed flat knitting machinery are typically made utilizing two needle beds, and employ a half-gauge knitting technique 16, which includes knitting alternating needles on opposing needle beds in order to manipulate loops back and forth to empty needles of the opposing bed. In half-gauge, each needle with a loop in one bed has an empty receiving needle in the opposing bed to which loops may be moved. Diagram 17 shows half gauge transfer to the front and diagram 18 shows half gauge transfer to the rear.

The manipulation requires the machine to rack one needle bed to align opposing needles for transfer, as shown in diagram 18. All stitches then reside on a single needle bed, as shown in diagram 19. As shown in diagram 20, to widen the tube, one needle bed then racks one or more needle positions, transfers half of the stitches which previously resided on the opposing bed, which are also on one side of the tube to their new positions on the opposing needle bed. The machine then repeats the transferring of the remaining half of the stitches, which previously resided on the opposing bed, racking in the opposite direction (as shown in diagram 21), and placing them in their new position on the opposing needle bed. This manipulation of stitches creates the shaping, narrowing or widening (diagram 22 shows the result of widening) of the upper, with small fashion marks, where the narrowing occurs due to placing two loops in the same hook, and small holes, where the widening occurs 22. The open spaces creating in widening (diagram 22) are then knitted in the next row of knitting. The resulting fabrication is two facing half-gauge jersey fabrics 16, each being a single bed fabric, having similar structure of a sock with an interior purl face and an exterior knit face. This type of widening and narrowing technique is also used for the knitting of current sock-like seamless tubular structures on V-bed flat knitting machinery with four needle beds. Diagram 23 shows transfer for half gauge rib. All two-needle-bed and four-needle-bed sock-like seamless tube structures currently manufactured on flat knitting machines result in half-gauge fabric, which is fifty-percent less dense than knitting all adjacent needles in a bed, due to taking every other needle out of action (half-gauge).

Whole garment technology is a weft knitting technique employed by flat V-bed machine builders that utilizes half-gauge knitting techniques in making these sock-like tube constructions (as shown in diagram 17), shaping the tubes to make footwear, and typically joining the shaped tubes into garments and other products. Half-gauge is used for these techniques due to transfer limitations of knitting and manipulating loops between two sets of opposing needles in a V-bed knitting machine and having limited destinations to transfer stitches. Half-gauge is also used due to the mechanical transfer limitations of knitting and manipulating loops between two sets of opposing needles in a four-needle bed V-bed knitting machine, both having limited destinations to transfer stitches.

In both sets of machinery, any loops which are transferred to the upper auxiliary beds must be transferred to the respective receiving bed(s), immediately in the next pass of the machine, and in the same direction that the machine knitting systems are moving. Current V-bed flat-knitted sock uppers, which utilize at least two needle beds, are created in half-gauge, using exclusively jersey-based (single bed) stitch structures such as jersey tuck, jersey knit, reverse jersey (purl), tubular jersey, and other sock structures similar to those made on circular weft-knitting machines (sock machines).

To create the three-dimensional sock-like footwear upper on a flat knitting machine, the machine utilizes loops on opposing needle beds 16, each creating a knit face 24 and purl side 25 fabric facing each other in a flattened tube structure. Alternating stitches on opposing needle beds are used for the purpose of transferring loops to the opposing open needles 17 to create shaping 19, 20, 21 and 22. To create the heel, the flat-knitting machine knits short rows of jersey in one portion of the tube to create the heel structure. The resulting tube sock-like upper structure is composed of one or more jersey-based knitting structures. Unfortunately, the jersey-based structures collapse on themselves, and the edges tend to roll toward the purl side. Jersey structure by itself is rarely suitable to attach to a sole and contain a foot in motion. Jersey structure typically require post processes, and or additional reinforcing materials to be knitted into the fabric, such as stiffening monofilaments and or thermoplastic materials to be added and later activated, and attachments to reinforce the structure. Half-gauge jersey-based fabrics do not connect the fabric on opposing needle beds, but rather jersey loops are manipulated to empty interstice needles on the opposing bed. Half Gauge jersey is even more impractical as a standalone structure choice for an upper, without significant reinforcing applications.

Double bed fabric such as rib, cardigan, full cardigan, half-gauge jacquard, and other half-gauge double bed stitches can also be made in this half-gauge manner on V-bed flat machines though shaping half-gauge versions of these double-bed fabrics on four needle beds (shown by 23 in FIG. 5). However, transferring loops between the two needle beds has limitations of racking one to two needle positions in either direction. Racking is the shifting of one needle bed a given number of needle positions to align a selected stitch or group of stitches to its new destination on the opposing bed. Racking more than one to two needles of half-gauge double-bed fabric (the width of the selected loop itself and its adjacent empty neighbor needle) risks ripping out the stitches and potentially destroying the needle hooks themselves.

Knitting a product such as an upper using the whole garment technique (also known as Knit and Wear manufacturing), is similar in shaping and transferring loops to the fully-fashioned technique, but with some important differences. The whole garment (Trademark of Shima Seiki of Japan) and or Knit and The sock-like versions of three-dimensionally weft knitted footwear uppers use exclusively jersey-based stitch structures made on circular weft-knitting machines, or on flat-knitting machines, also using exclusively jersey-based fabrications, otherwise known as single-bed fabrications created in a tube structure.

To create the three-dimensional sock-like footwear upper on a flat knitting machine, as shown in FIG. 2B and FIG. 5, the flat-knitting machine utilizes loops opposing needle beds, each creating a technical knit face 24 and technical purl side 25 fabric facing each other in a tube structure. The machine may also utilize alternating stitches on opposing needle beds for the purpose of transferring loops to the opposing open hooks to create shaping (17 in FIG. 5).

To create the heel, the flat-knitting machine knits short rows of jersey in one portion of the tube to create the heel structure. The resulting upper structure is composed of one or more jersey-based knitting structures. Conventional methods of manufacturing fully-fashioned knitted footwear uppers on V-bed flat knitting machines utilize double-knit fabrications such as Milano, half-Milano, spacer fabrics, pique, and other such double fabrications, and or sock like jersey structures created in the 'Whole Garment' (Trademark Shima Seiki) and or 'Knit and Wear' technique (Trademark of H. Stoll Ag & Co. KG in Reutlingen, Germany). Fully fashioned double-bed uppers, jersey-sock uppers and Whole Garment and Knit and Wear technique products are semi-finished textiles which require sewing seams as in the case of fully-fashioned uppers. Sock-like tubes and Whole Garment and or Knit and Wear technique uppers require additional manufacturing steps to ready the footwear upper for the shoe manufacturing process.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 7C is a diagram of an exemplary seamless weft knitted article of footwear with an integrated sole component joined to the heel by using a knitting process in accordance with an embodiment of the present disclosure.

Figure 1A:
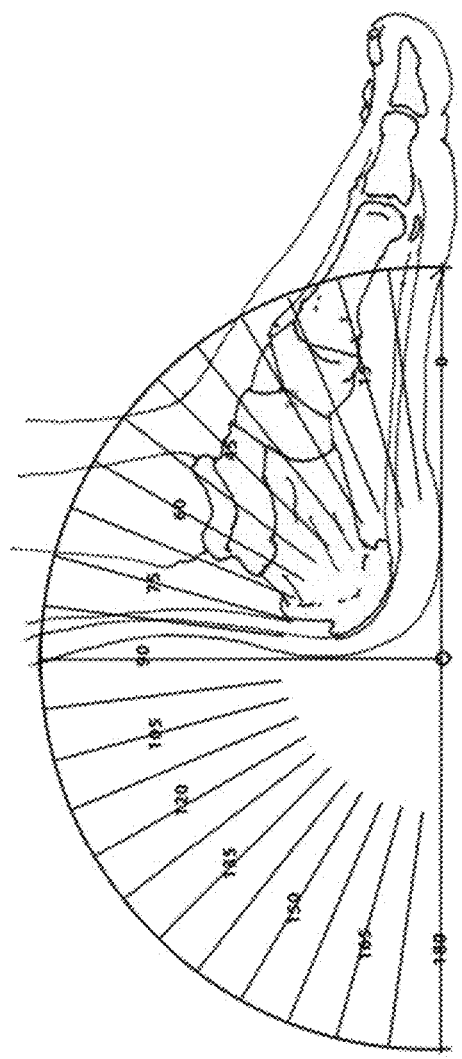
FIG. 1A are diagrams demonstrating the parts and angle of a normal heel on a human foot as compared to its sole and or a flat surface.
Figure 1A:
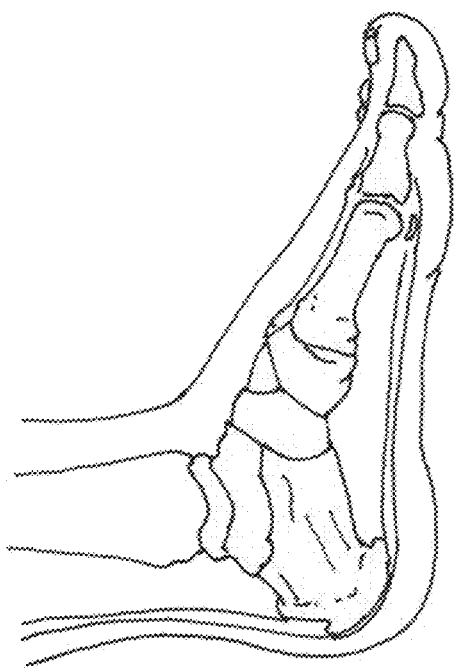
Figure 1B:
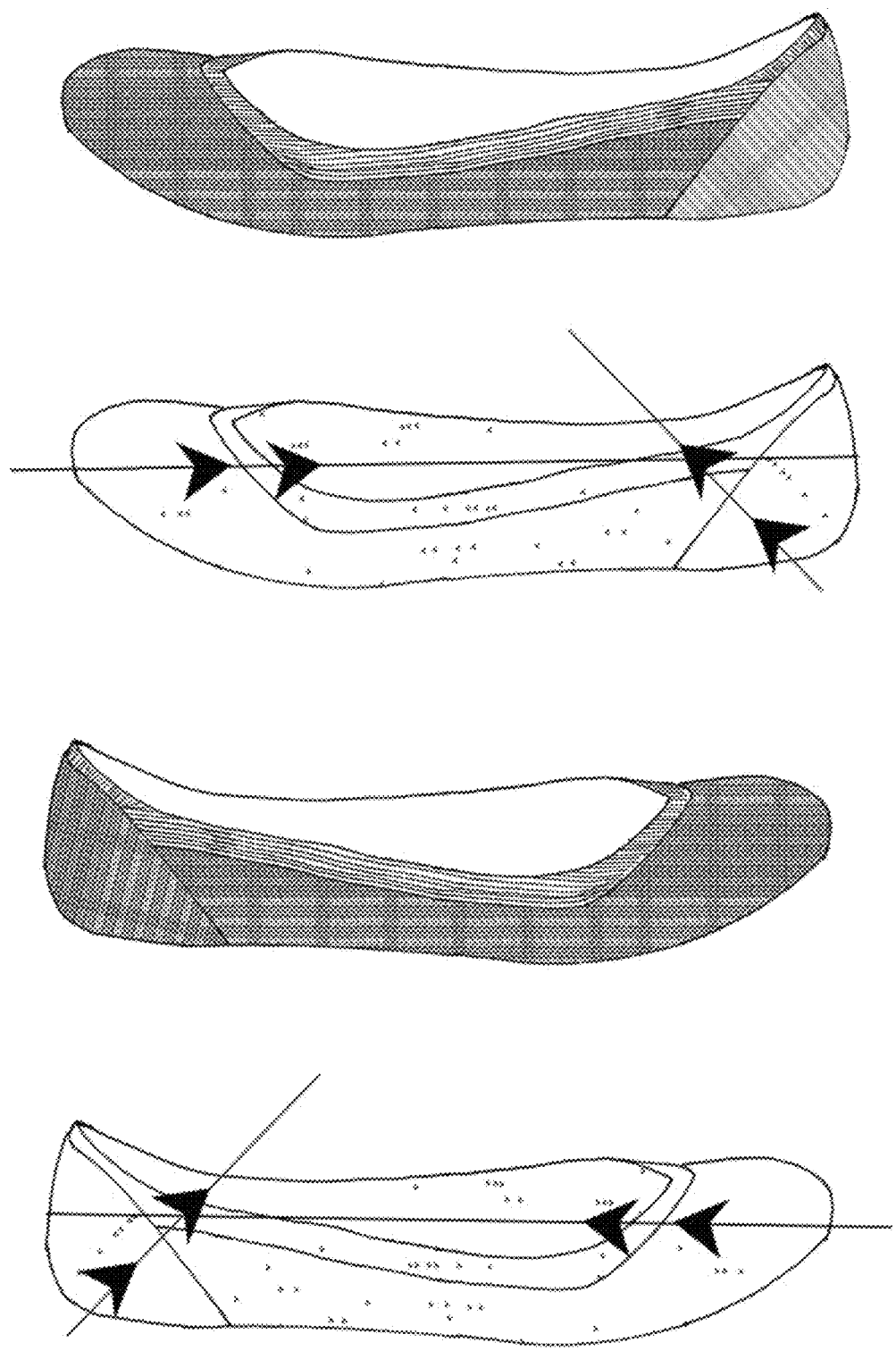
FIG. 1B are diagrams of the grain lines of the heel and body of a seamless article of footwear produced on a two-needle-bed knitting machine with double bed fabric using short rowing.

All Figures disclosed herein are © Copyright 2018-2019 Fabdesigns Inc. All rights reserved.

SUMMARY

Embodiments of the present disclosure are directed to knitted footwear uppers and systems and methods of making the same. More particularly, embodiments of the present disclosure provide fully finished three-dimensionally weft knitted footwear and the related method of manufacturing a footwear upper structure knitted on V-bed ("weft") flat knitting machinery. The method includes manipulating one or more double-knit stitch types and joining the stitches exclusively in the knitting process to create a seamless upper to fit a user's foot. A resulting upper advantageously has no sewn seams and requires no manual post process to cut or sew the upper to create the dimensional shape. The process creates a seamless, dimensionally stable footwear upper, as a unitary textile construction with an integrated anatomically appropriate heel. The entire upper, including the closure element of the upper, may be completed exclusively by the knitting machine, ready for following shoe making processes.

Embodiments of the present disclosure advantageously provide a shoe upper making mechanism that eliminates sewing seams and minimizes material waste by creating a seamless and finished upper in a unitary textile construction which is shaped entirely by a knitting machine. The finished upper is then ready for following shoe manufacturing processes.

Embodiments of the present disclosure advantageously enable creation of a stable seamless, finished upper, which is built and shaped exclusively in the knitting process by shaping steady double-knit structures. In addition to securing the dimensional stability of a seamless, finished unitary upper construction being created entirely in the knitting process, the upper may also incorporate appendage structures of support and or aesthetic applications that are also knitted in the same knitting process. Further, the disclosed mechanisms can advantageously eliminate the need for external sub-assemblies, and the need for management of extra processes, materials, and scrap. Furthermore, in creating a seamless, finished unitary upper construction, the angle of the heel is advantageously and anatomically optimized by utilizing four-needle-bed technology to join facets of the double-knitted upper in steep, right, and obtuse angles to fit the anatomy of the foot.

The foregoing Summary and the following detailed description will be better understood when read in conjunction with the accompanying Figures. Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

DETAILED DESCRIPTION

Exemplary Embodiments

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Embodiments of the present disclosure use a knitting mechanism to shape an upper, where a complete upper is knitted in three-dimensions to the desired shape and size. The knitting may use full-gauge double bed fabric, manipulated on at least three needle beds of a flat knitting machine. Unlike the conventional jersey-based tube versions of footwear uppers, and the whole garment technique jersey uppers, or the fully-fashioned semi-finished flat knitted textile uppers currently on the market, the disclosed novel mechanism advantageously allows a completely finished upper with no seams by knitting various components in one knitting process and the components are connected to one another by the knitting stitches generated in the same knitting process.

According to embodiments of the present disclosure, in creating fully finished three-dimensional knitted uppers, loops are formed in one or more needle beds and relocated by knitting points, or needles in auxiliary needle beds. The knitting machine may be mechanically and automatically manipulated by a pattern program to knit and move loops to complete such a shoe upper. The grain of the upper fabric may be shifted in multiple directions individually or simultaneously during the knitting process. The heel area is completed by the machine in the same knitting process. As a result, a one-piece footwear upper is advantageously produced with no human intervention.

Figure 6A:
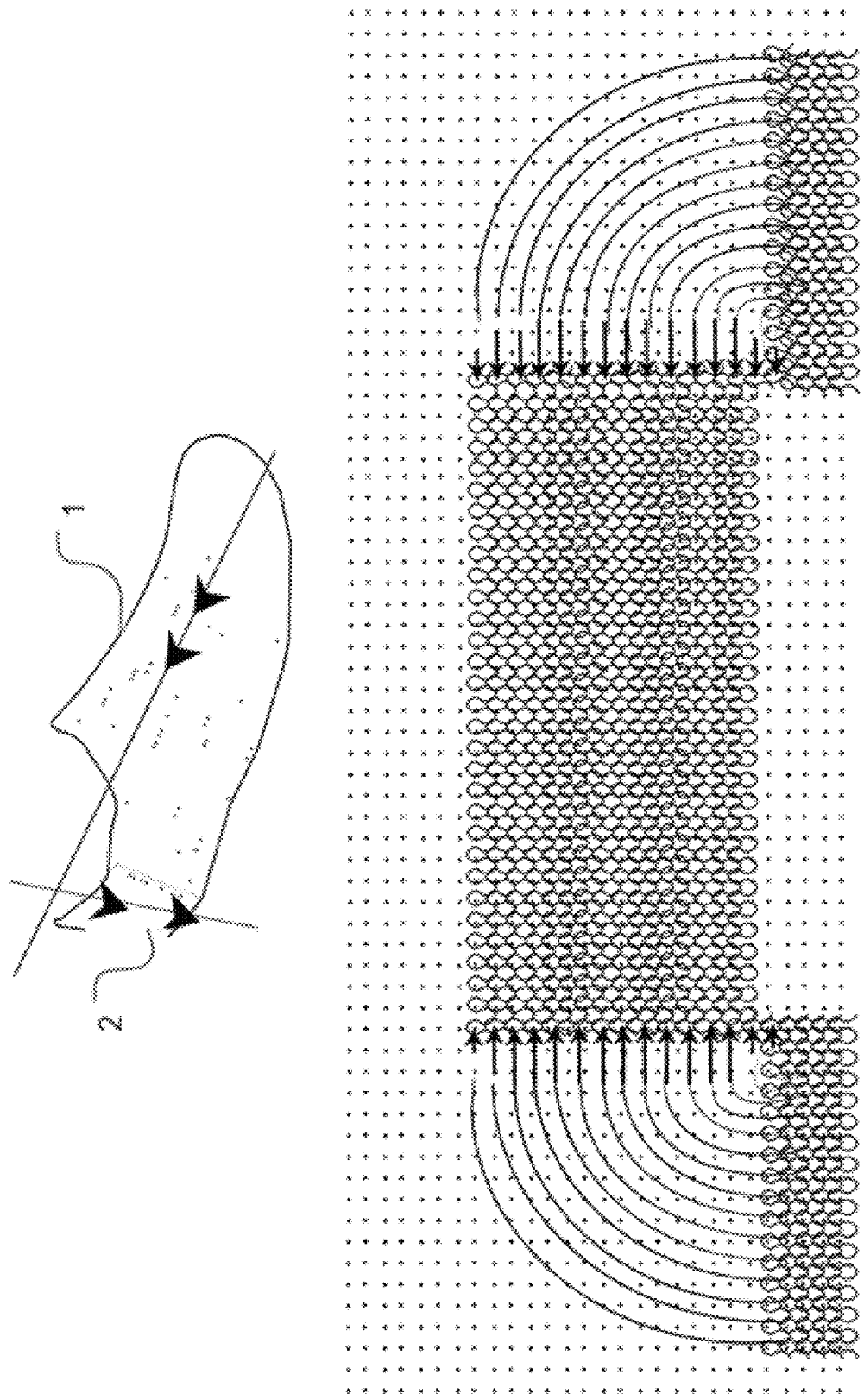
FIG. 6A is a loop diagram of the heel area of an exemplary seamless article of footwear produced on a four-needle-bed knitting machine with double bed fabric and seamlessly inserting or joining the facets of the supportive panel in accordance with an embodiment of the present disclosure, where the heel angle can be a steep, right, and or an obtuse angle.

In some embodiments, the grain of the heel is perpendicular to the remainder of the footwear upper. FIG. 6A is a loop diagram of the heel area of an exemplary seamless article of footwear produced on a four-needle-bed knitting machine with double bed fabric and seamlessly inserting or joining the facets of a supportive panel in accordance with an embodiment of the present disclosure, where the heel angle can be a steep, right, and or an obtuse angle.

In some embodiments, the footwear upper's fabric grain 1 (the grain for the main body) changes direction ninety degrees in the knitting process as the heel area is formed, and consequently the stitches appear perpendicular in the heel fabric grain 2 (as shown by the arrowed curves in FIG. 6A). During this process of creating the heel or other attachment or appendages as described below, the double bed loops of the opposing side of the heel are transferred to the additional third and fourth needle bed and then attached to the face or the reverse of the double bed fabric as the shape requires. In some embodiments, all movements are performed automatically and exclusively by the knitting machine, with no human intervention needed for attaching together different components of the footwear upper.

In the embodiment shown in FIG. 6A, a heel, including a heel component, is created in the same knitting process and manipulated exclusively by the knitting machine into place to complete a finished upper to a desired size and shape. The knitting process uses more than two needle beds on the flat-knitting machine. In some embodiments, a four-needle bed machine is used.

Figure 3A:
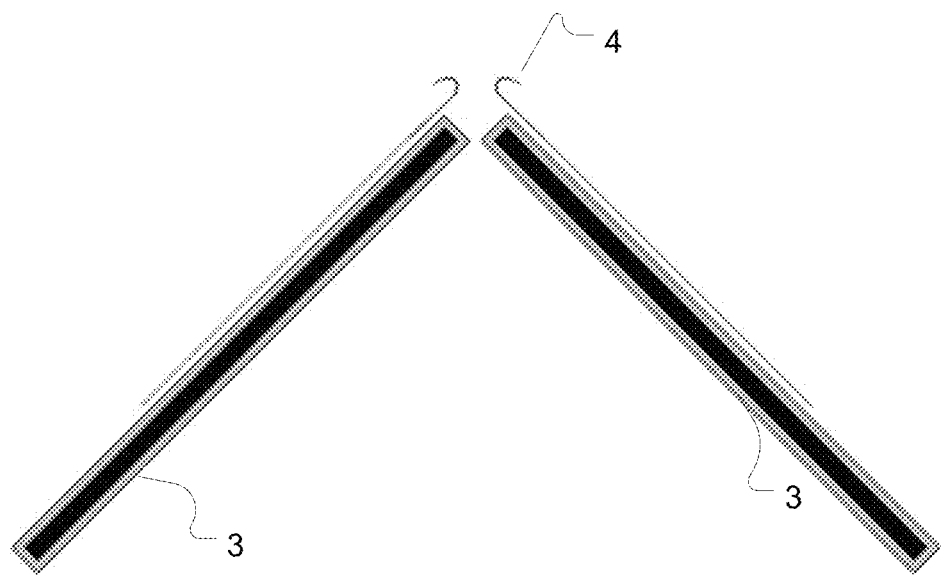
FIG. 3A is a side view diagram of the positioning of the needle beds and latch needles of a two-needle bed flat V-bed knitting machine.
Figure 3B:
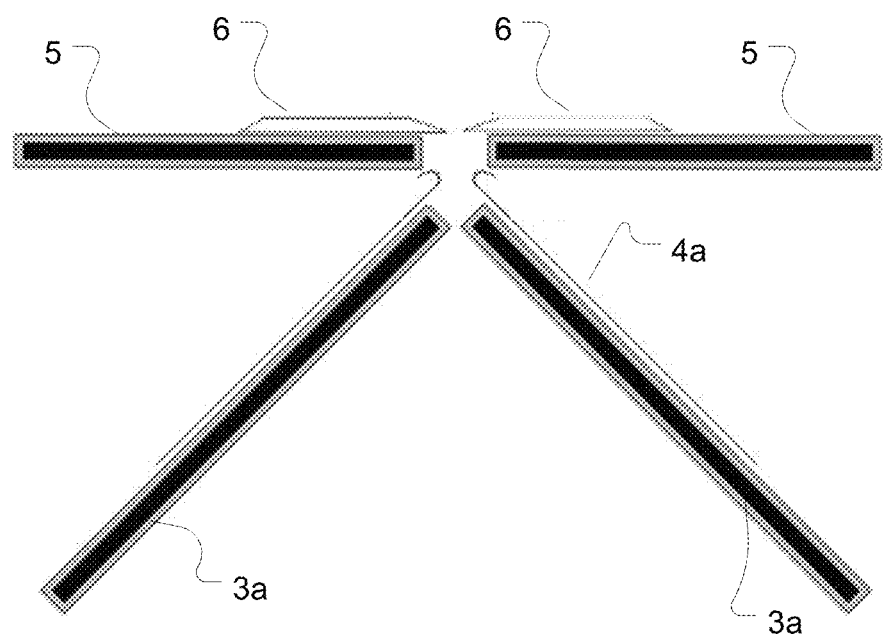
FIG. 3B is a side view diagram of the positioning of the needle beds and latch needles in a four needle bed machines, with a two-needle bed flat V-bed and two additional auxiliary beds and transfer points.

Particularly, as shown in FIG. 3B and FIG. 6A, when knitting the heel, the machine uses the auxiliary beds 5, to transfer loops from the bottom needle beds 3a, manipulating a full gauge set of loops on both needle beds (as shown in FIG. 6A), inserting one or more separate components in the knitting process, and further shaping the upper. The upper and various components therein may be made from sturdy double-bed fabric such as Milano, half-Milano, spacer fabrics, pique, and other such double fabrications and combinations into tubes, shells, pockets, and corresponding attached components.

Figure 1C:
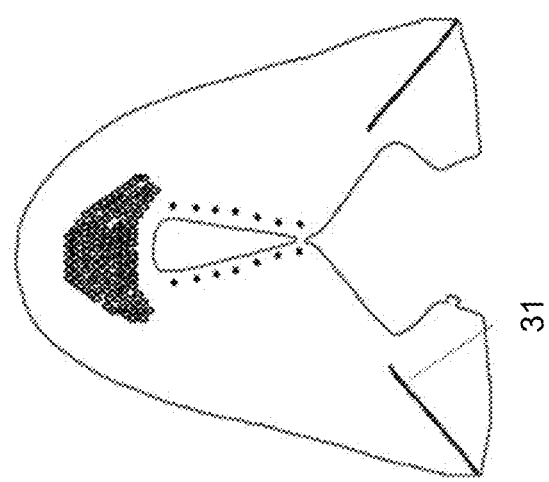
FIG. 1C is a loop diagram of the heel area of a knitted-to-shape three-dimensional semi-finished textile upper using short rowing.
Figure 1C:
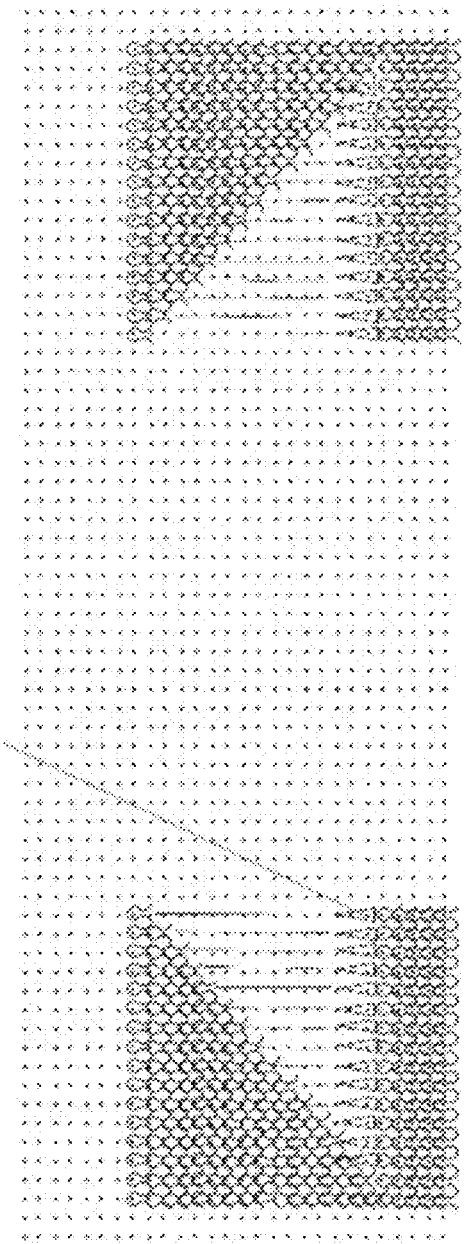
Figure 2A:
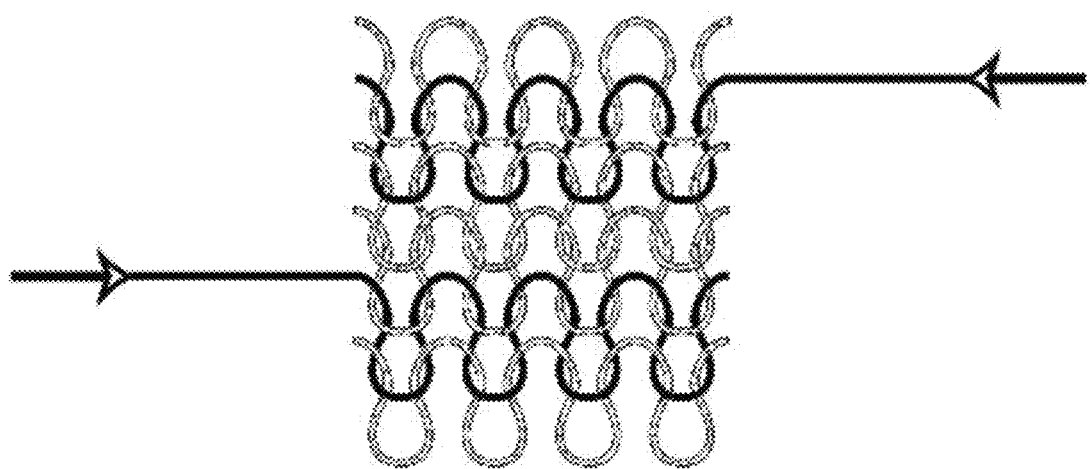
FIG. 2A is a diagram of weft knitting, and the horizontal directions by which strands are inserted into fabric and entangled to create 'weft' knit fabric.
Figure 2B:
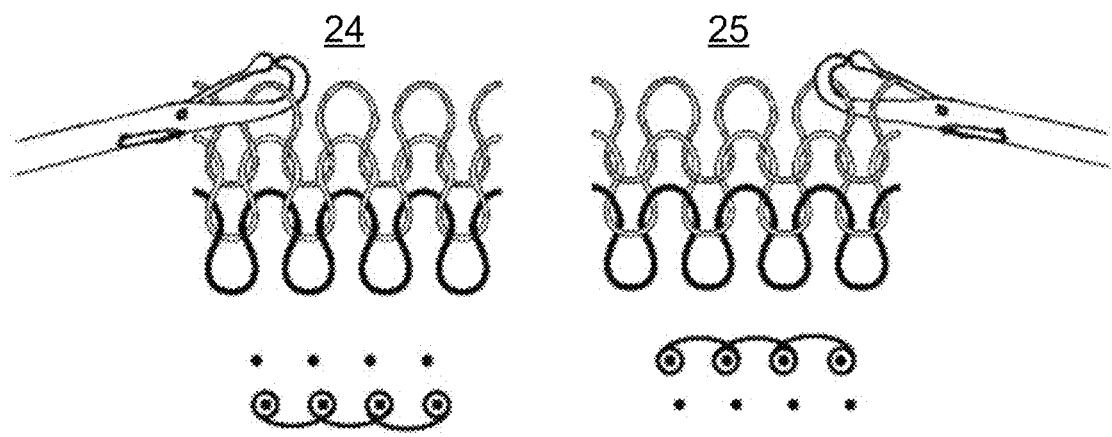
FIG. 2B is a diagram of latch needles used in weft knitting, engaging the strands, which are inserted into the knitting machine, the fabric technical jersey knit face and technical jersey purl back created on either the front or the rear needle bed.
Figure 4A:
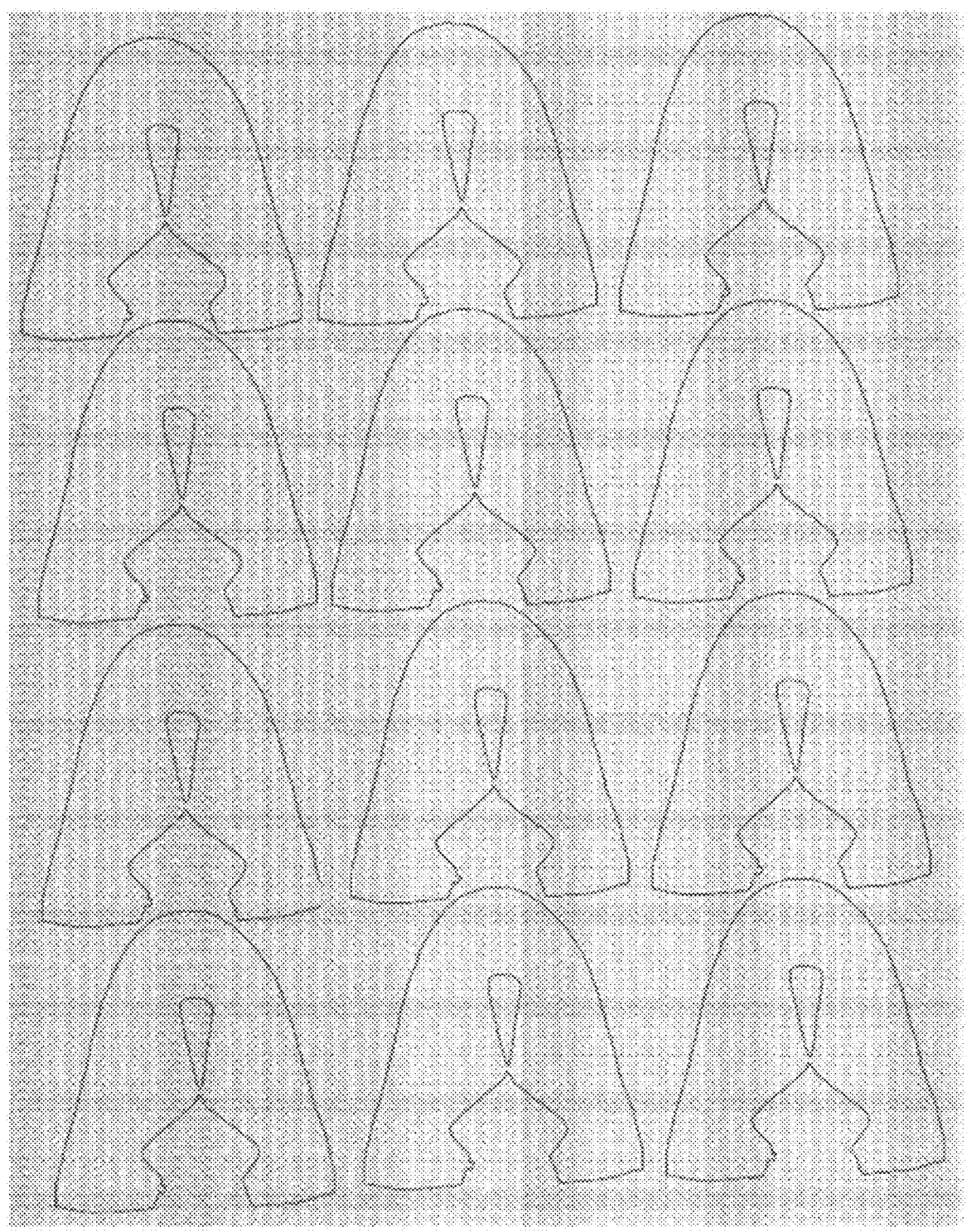
FIG. 4A is a diagram of two-dimensional roll goods with two-dimensional footwear upper pattern pieces to be cut and associated waste material in accordance with the conventional art.
Figure 4B:
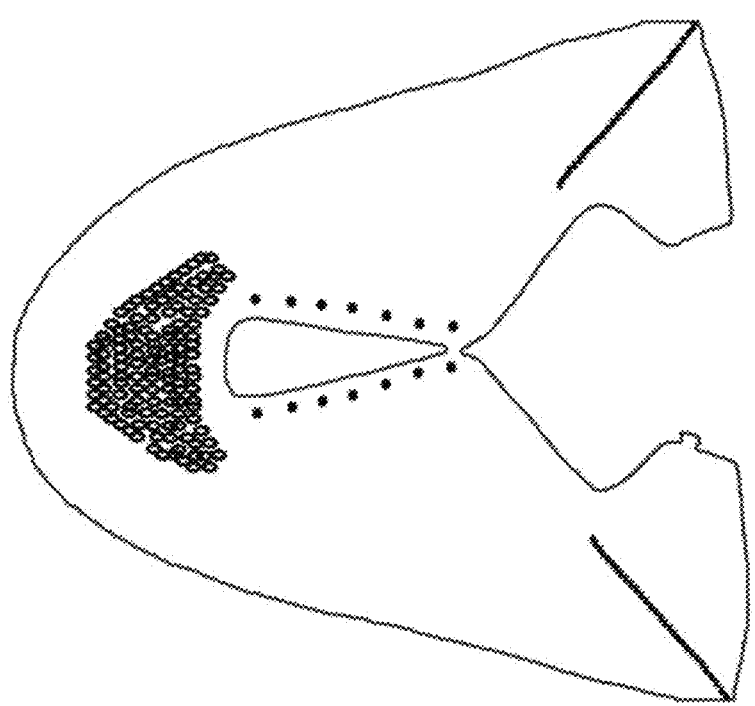
FIG. 4B is a diagram of a knitted to shape three-dimensional footwear upper with one or more knit textures according to a conventional fully-fashioned approach.
Figure 4C:
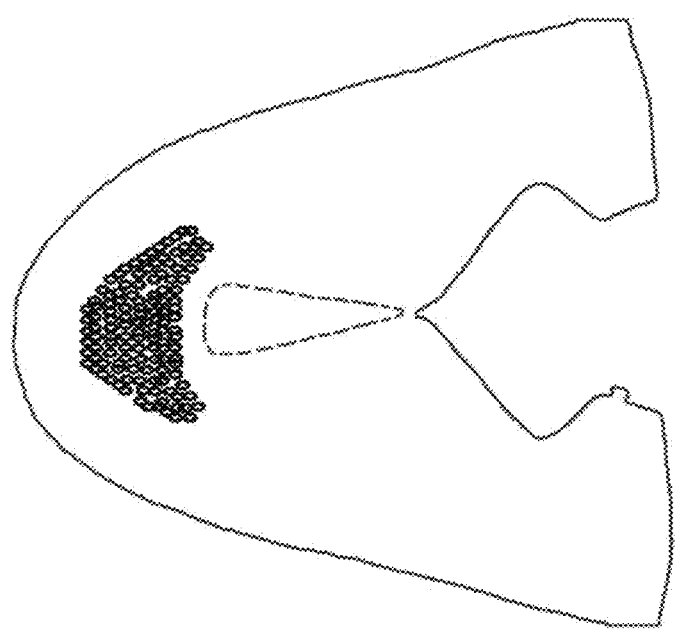
FIG. 4C is a diagram of a knitted to shape two-dimensional footwear upper with one or more knit textures according to a conventional hybrid approach.
Figure 4D:
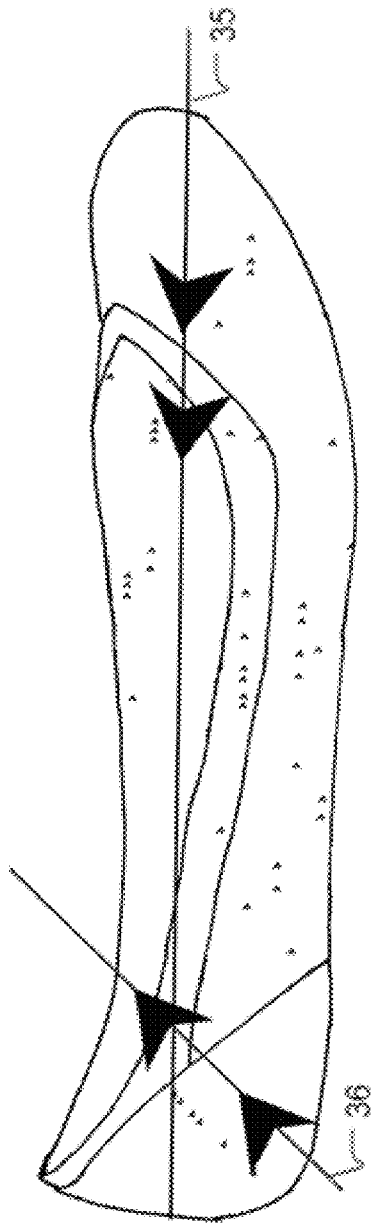
FIG. 4D is a loop diagram showing the heel area of a seamless article of footwear produced on a two-needle-bed knitting machine with double bed fabric using short rowing technique.
Figure 4D:
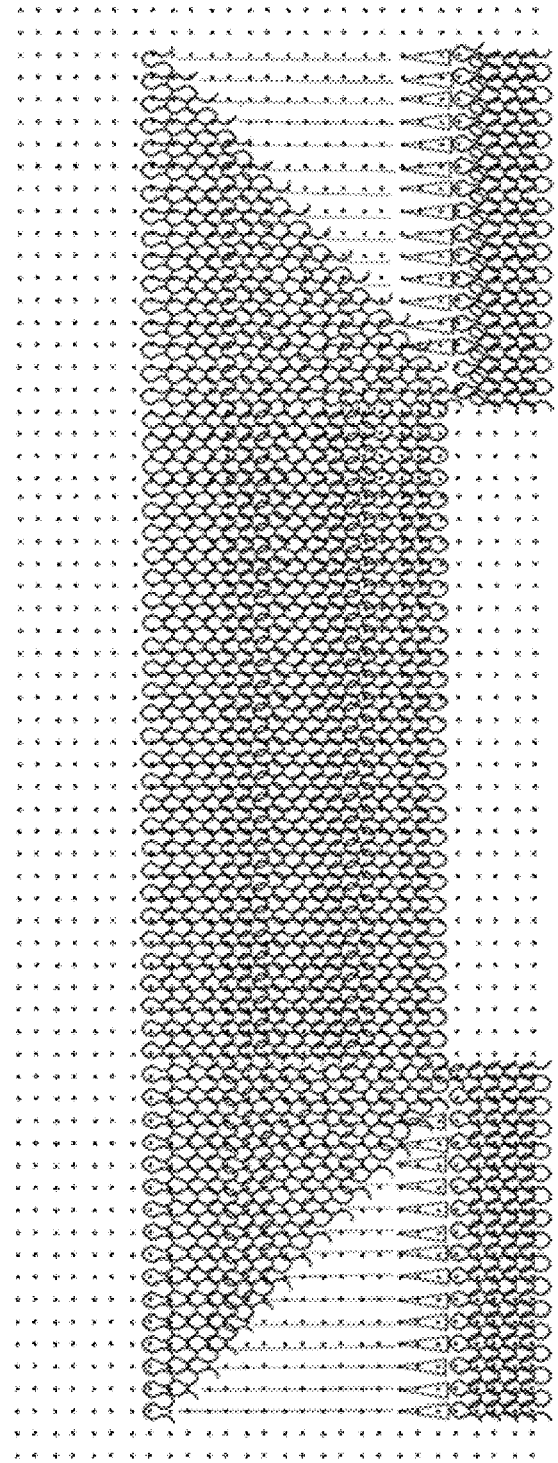
Figure 5:
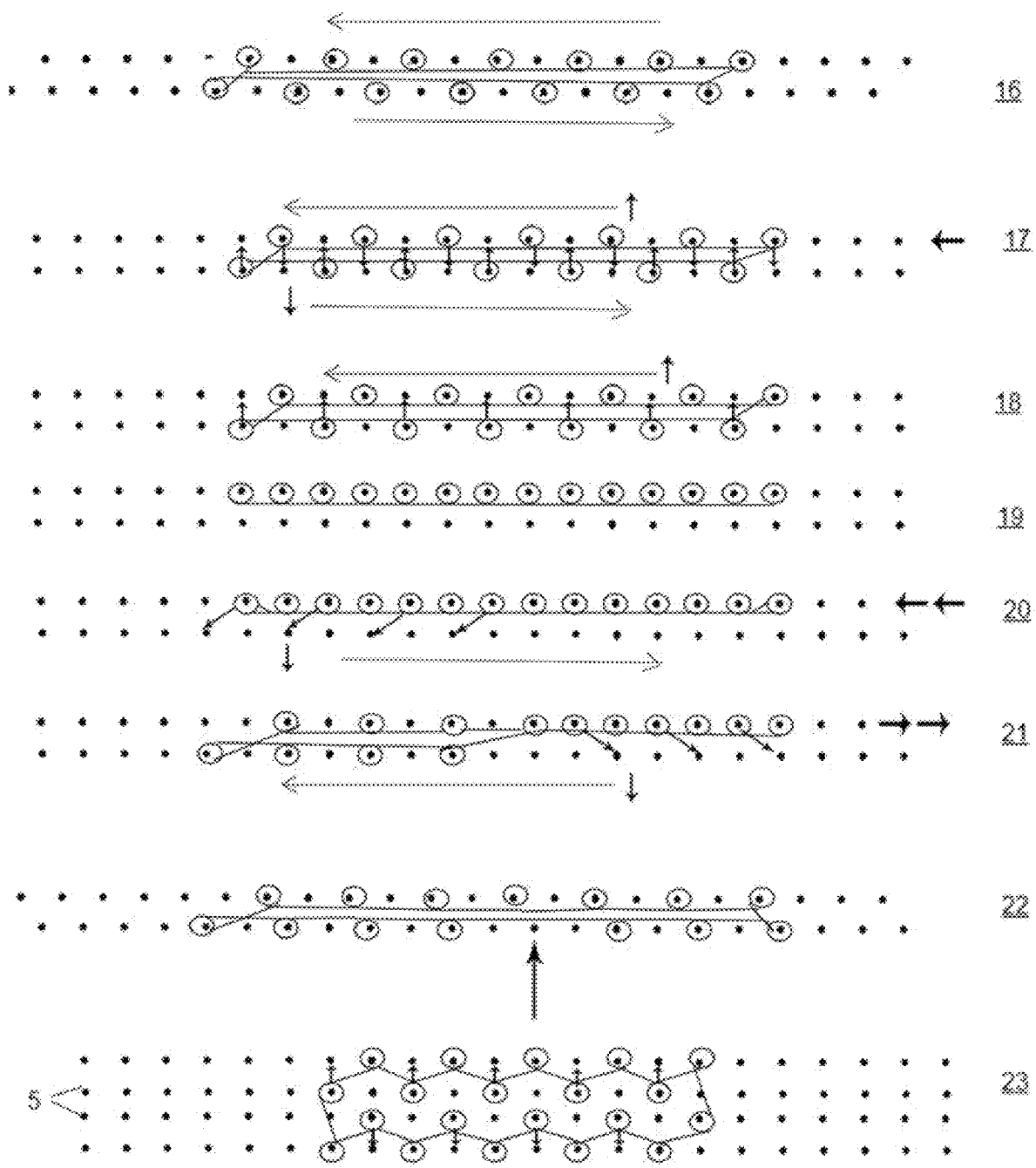
FIG. 5 is a loop diagram of transferring techniques used in half-gauge tubular knitting to widen a tube on a flat knitting machine.

The knitting structure and shaping processes disclosed herein differ greatly from the conventional sock-like and whole garment jersey knitting structure and shaping process as shown in FIG. 5 and differ substantially from the knitting structure and shaping process as shown in FIG. 1C. Unlike the current double-bed uppers shown in FIG. 4D, an exemplary shoe upper is knitted in a unitary construction.

Figure 6B:
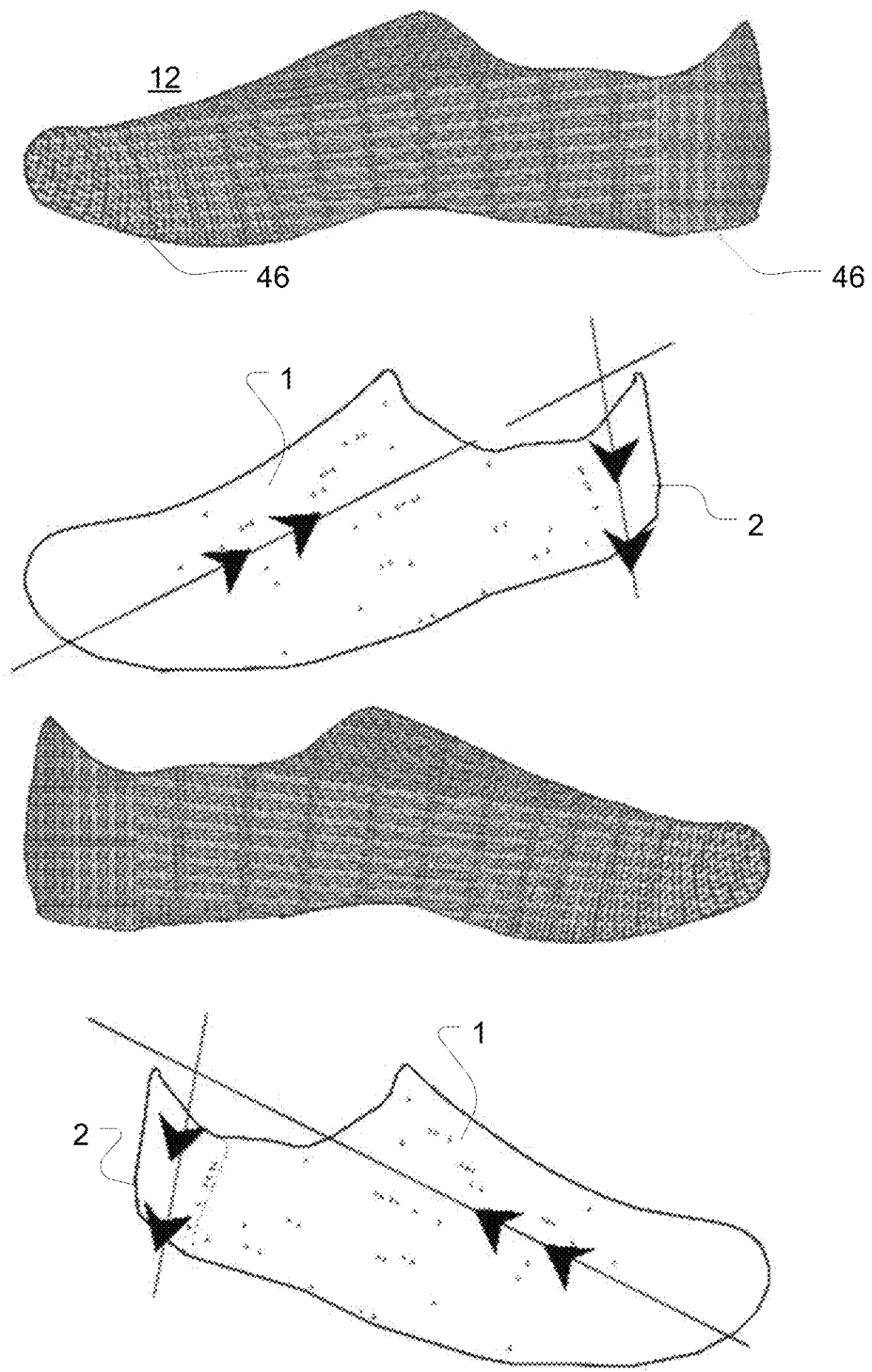
FIG. 6B are diagrams of the grain lines of the heel and body fabrics of a seamless article of footwear produced on a four-needle-bed knitting machine with double bed half-milano knit 46 fabric and seamlessly inserting or joining the facets of the supportive panel in accordance with an embodiment of the present disclosure.

As shown in FIG. 6A, in an exemplary knitting structure and shaping process, the machine closes one or more sides of the upper by knitting a side as an insert in the knitting process. The machine manipulates the insert, transfers double knit stitches and attaches the insert to the remaining sides. FIG. 6B is a diagram of the grain lines of the heel and body fabrics of a seamless article of footwear produced on a four-needle-bed knitting machine with double bed fabric and seamlessly inserting or joining the facets of the supportive panel in accordance with an embodiment of the present disclosure. For example, to attach the heel side of the shoe upper, the fabric grain of the inserted side (the heel) is turned counter to the fabric grain of the remaining upper, as shown in FIG. 6B. To create the insert, loops are formed adjacent to the loops to which they will be joined, and each loop is transferred to its receiving loop to join. This process produces no seam. This joining of the heel-insert may be symmetrical or asymmetrical. This joining technique of the heel-insert may be approximately perpendicular (at a ninety-degree angle), steep angle, acute, angle, or obtuse.

The body of the upper may be made of one or more materials, including for example natural fibers, synthetic polymer extrusions, thermoplastic, metalized fibers, wire, chain, webbing, braids, silicon, rubberized, coated, elasticated, synthetic polymers, and other well known traditional fibers, as well as fiber strands used as a structural base for fiber reinforced polymer ("FRP"), including hemp, flax, linen, glass, basalt, ultra-high molecular weight polyethylene (UHMWPE), carbon fiber ("graphene reinforced polymer") and others. A material may be used in the entire upper or specific parts of the upper as needed for the performance characteristics required of the particular zone. For example, the toe and heel areas may require more abrasion resistance and incorporate an aramid material. The ankle area may incorporate the extra stretch and recovery of elasticated material. The instep and mid-foot may incorporate a monofilament to stabilize the foot onto the sole. An attached insole (e.g., 33 in FIG. 8D) may incorporate and anti-microbial material. An attached outer sole may incorporate a heavy gauge monofilament for building a knitted spring structure and or a composite material of fiber reinforced polymer, which is later processed. An attached heel flap may incorporate an additional aesthetic element with fiber optics or reflective materials. A combination of knit structure and incorporating a 'cloaking' or radar-absorbent material may be knitted as an attached outer shell, encasing an inner shoe upper for structure.

A stitch type may be used in the entire upper or specific parts of the upper as needed for the performance characteristics required of the particular zone for the same reasons. According to embodiments of the present disclosure, as shown in FIG. 6B, when forming the heel area in the knitting process, the footwear upper's fabric grain 1 can change direction by greater than 75 degrees (e.g., 90 degrees as shown by the arrowed lines). Consequently the stitches can appear approximately perpendicular in the heel fabric grain.

In some embodiments, during the process of creating the heel or other attachment, the double bed loops of the opposing side of the heel are transferred to the additional third and fourth needle beds and then attached to the face or the reverse side of the double bed fabric as the shape requires. All movements are performed automatically by the knitting machine, with no human intervention.

The textile fabric comprising the upper may include one or more stitch types, for example including single bed ("jersey"), double bed fabric, spacer fabric, intarsia, net fabric, inlay fabric (horizontal, vertical, and/or diagonal), or other weft knit construction. The same stitch structure may be used in the entire upper or a plurality of parts of the upper. A stitch type may be used in the entire upper or specific parts of the upper as needed for the performance characteristics required of the particular zone for particular reasons. A plurality of stitch structures may be knitted into specific areas as needed for the performance characteristics required of the particular zone. For example, the toe and heel areas may be more densely knitted. The ankle area may incorporate extra stretch and recovery structures.

FIG. 6B is a diagram of a seamless weft knitted article of footwear with an integrated heel joined in the same knitting process, plus: heel component attached at the heel, tongue component with spacer attached at the toe, and side components attached at the sides. A tongue is folded inside the upper.

Figure 7A:
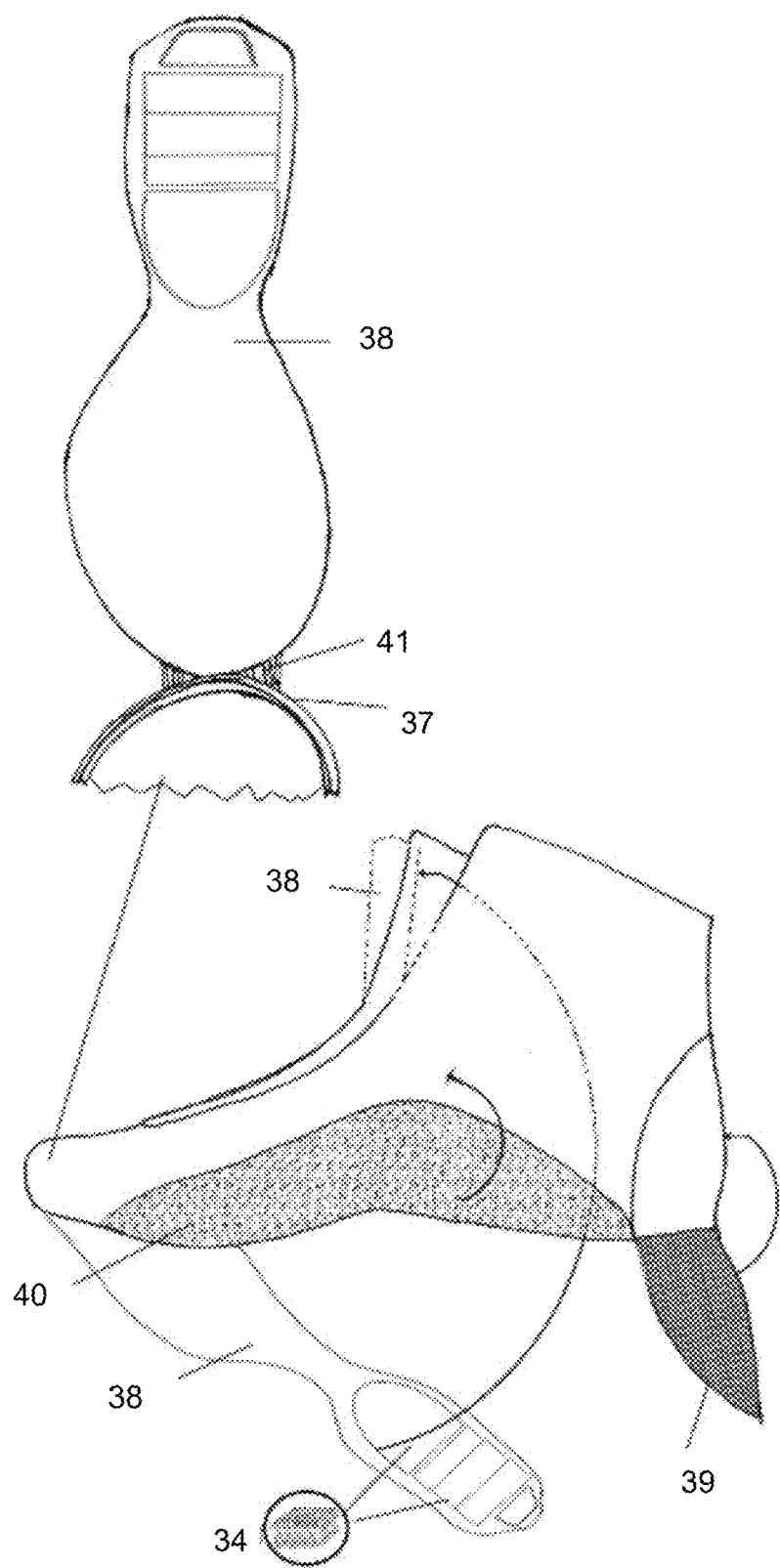
FIG. 7A is a diagram of an exemplary seamless weft knitted article of footwear with an integrated Fiber Reinforced Fiber component heel and an integrated Fiber Reinforced Fiber toe component, both joined in the same knitting process with a heat resistant separating material in accordance with an embodiment of the present disclosure.
Figure 7B:
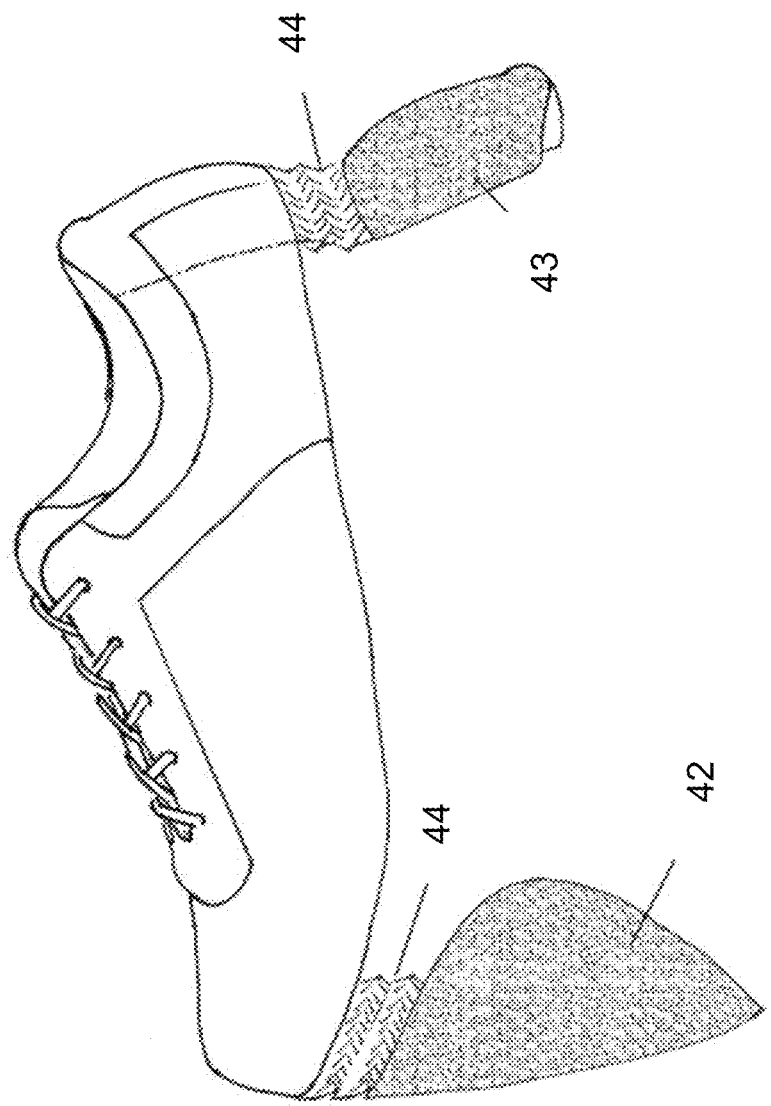
FIG. 7B is a diagram of an exemplary seamless weft knitted article of footwear with an integrated sole component joined to the heel by using a knitting process in accordance with an embodiment of the present disclosure.

FIG. 7A is a diagram of an exemplary seamless weft knitted article of footwear with an integrated Fiber Reinforced Fiber component heel 39 and an integrated Fiber Reinforced Fiber toe component, both joined in the same knitting process with a heat resistant separating material and a small waste section 41 in accordance with an embodiment of the present disclosure. 37 in FIG. 7A shows a pointelle structure resulting from the knitting process. FIG. 7B is a diagram of an exemplary seamless weft knitted article of footwear with an integrated sole component joined to the heel in the same knitting process in accordance with an embodiment of the present disclosure. FIG. 7C is a diagram of an exemplary seamless weft knitted article of footwear with an integrated sole component joined to the heel in the same knitting process in accordance with an embodiment of the present disclosure.

The instep may incorporate a net or mesh structure for ventilation; and an attached insole may incorporate padding. An attached outer sole as shown in FIG. 7C may incorporate a rigid or knitted spring structure. An attached heel flap as shown in FIG. 7A may incorporate an additional aesthetic element.

According to the embodiments of the present disclosure, a knitting machine integrates the production of multiple sides of an upper in a knitting process and may also integrate the production of one or more component appendages in the same knitting process. All dimensional shaping of the upper and any components can be carried out exclusively by a knitting machine, for example a V-bed knitting machine. An attached component may be any such extension of an edge of a separate component, or the body of the upper, such as a tongue component 38, which is attached at the toe and is folded to the upper body in a post process. In the post process, the tongue appendage 38 may be folded to the upper to emerge through the opening in the instep of the upper as in the final product. Another appendage might be a heel support or heel reinforcement structure 39, which is knit onto the heel section in the same knitting process and may be folded inside the upper or onto the outside of the upper for support or aesthetic reasons. Another appendage component might be a side support (or side reinforcement) 40, similarly formed in the same knitting process, which is knit onto one or more sides. The side support may be folded inside the upper or onto the outside of the upper for support or aesthetic reasons.

Figure 8A:
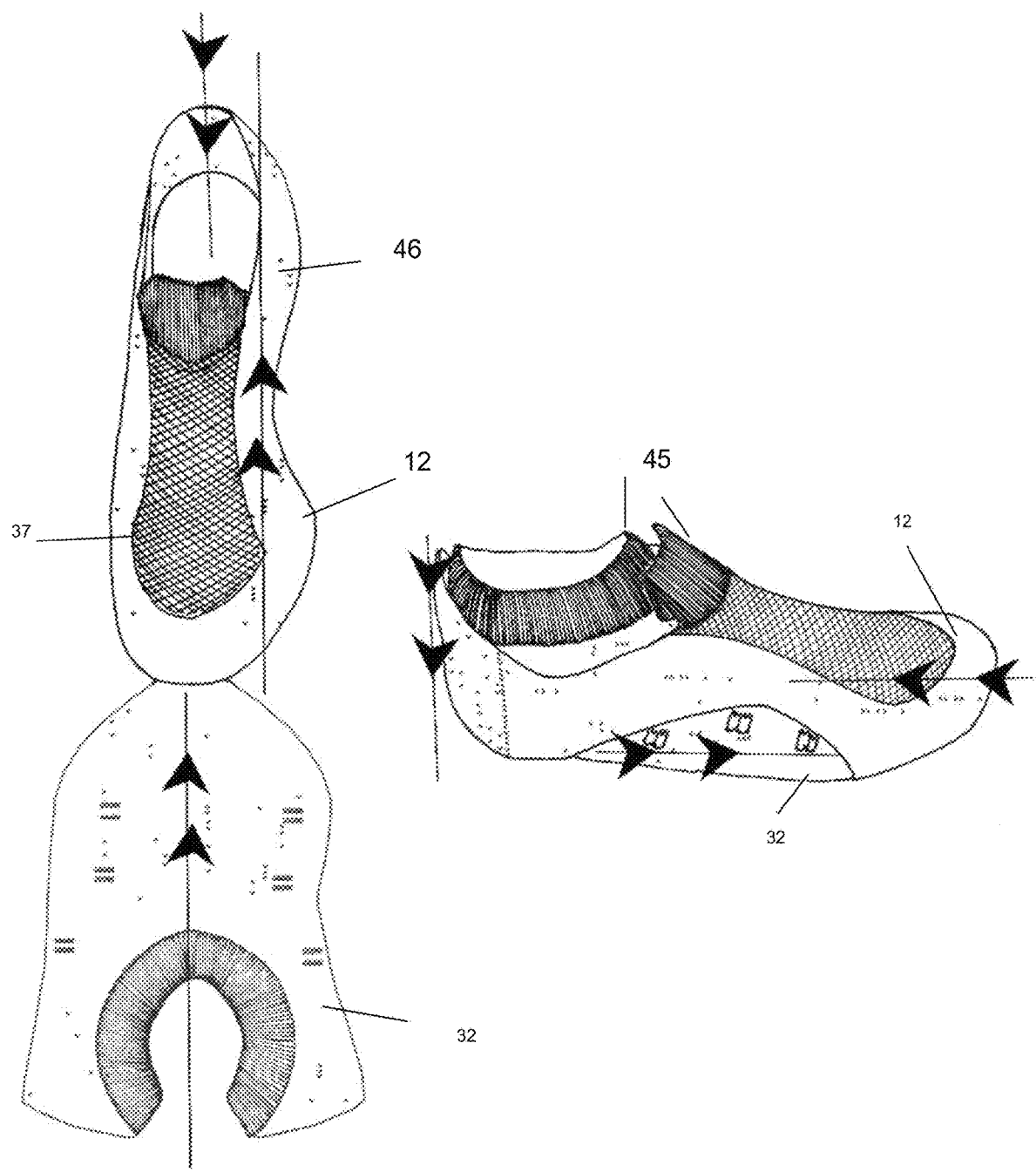
FIG. 8A is a diagram of an exemplary seamless weft knitted article of footwear with an integrated sub-layer attached at the toe and corresponding to the upper, while knitted by using a knitting process, and the grain lines of each layer and heel in accordance with an embodiment of the present disclosure.
Figure 8B:
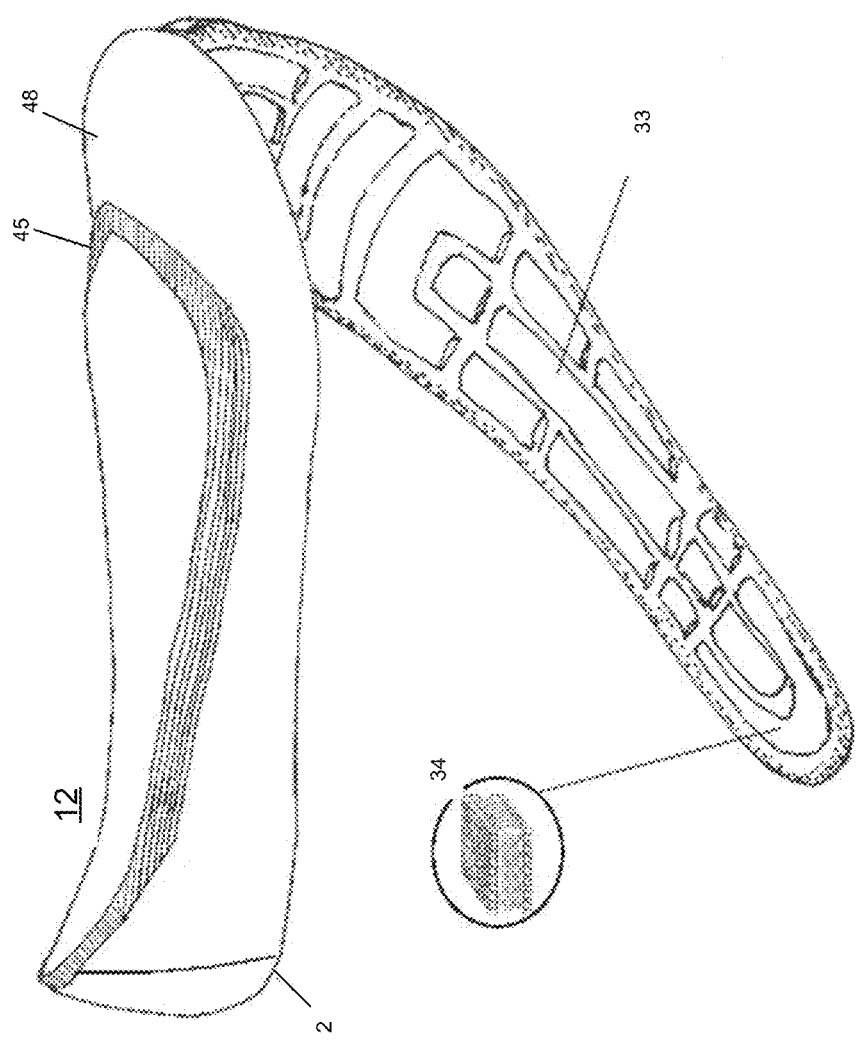
FIG. 8B is a diagram of an exemplary seamless weft knitted article of footwear with an integrated sole/insole attached at the toe by using a knitting process in accordance with an embodiment of the present disclosure.
Figure 8C:
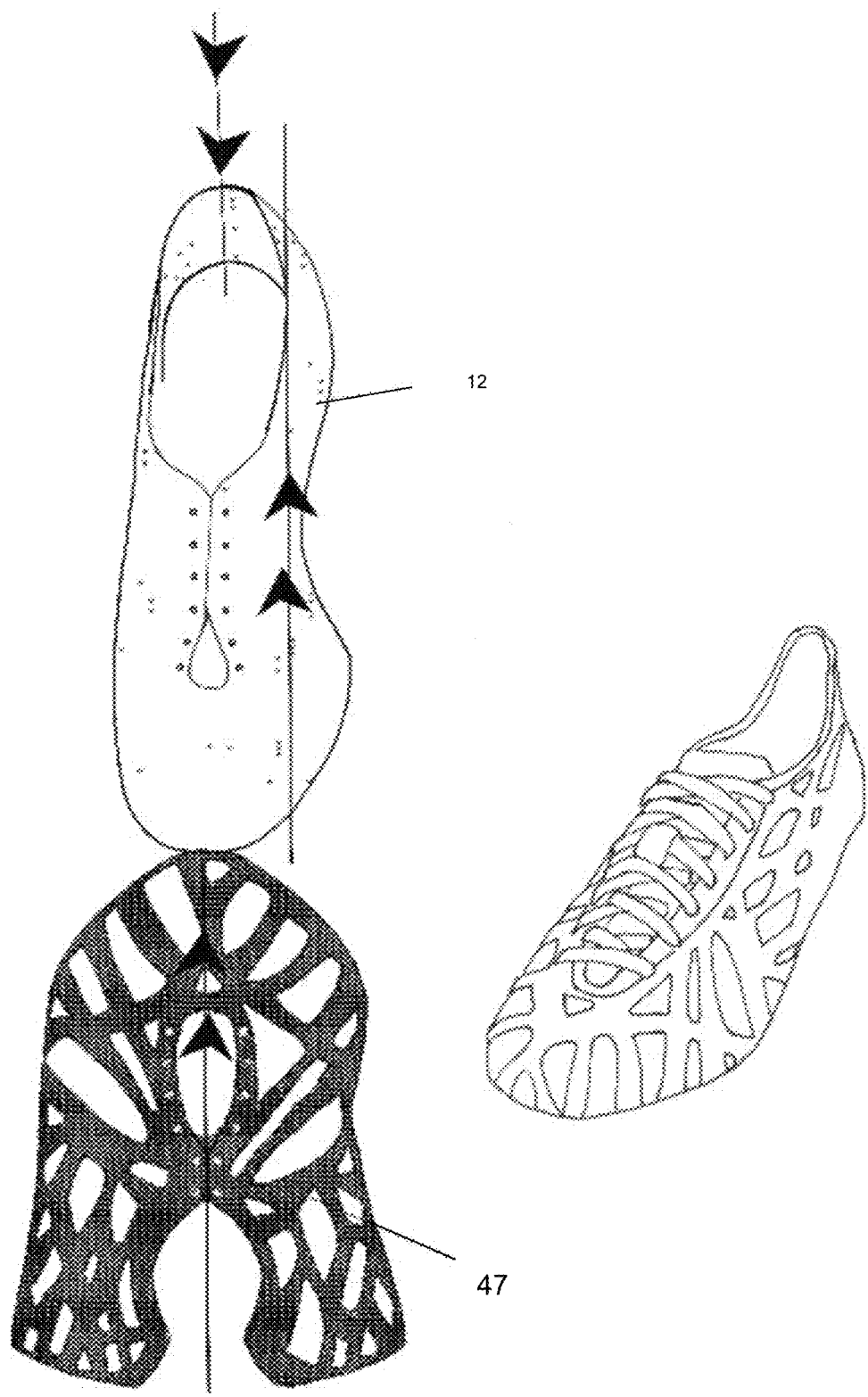
FIG. 8C is a diagram of an exemplary seamless weft knitted article of footwear with an integrated outer layer attached at the toe by using a knitting process in accordance with an embodiment of the present disclosure.

FIG. 8A is a diagram of an exemplary seamless weft knitted article of footwear with an integrated sub-layer, including a 1×1 rib edge 45, attached at the toe and corresponding to the upper, while knitted in the same knitting process, and the grain lines of each layer and heel in accordance with an embodiment of the present disclosure. FIG. 8B is a diagram of an exemplary seamless weft knitted article of footwear with an integrated sole/insole attached at the toe in the same knitting process in accordance with an embodiment of the present disclosure. FIG. 8C is a diagram of an exemplary seamless weft knitted article of footwear with an integrated outer layer attached at the toe in the same knitting process in accordance with an embodiment of the present disclosure.

In the embodiment shown in FIG. 8A, an attached appendage can be an entire separate upper or a portion of an upper (e.g., an under-shoe layer 32), which is finished in a separate process and folded inside and or on top of the fully finished upper. In the embodiment shown in FIG. 8B, an attached appendage may be an entire separate sole or insole, where the structure of the component appendage sole or insole 33 may be completely different than the upper itself (foot upper 12). The sole or insole may include a single structure or combination of various stitch techniques such as for instance spacer 34 structure, welt, jacquard, Milano, ½ Milano, mesh pointelle, textured jacquard, ripples, dimensional structures, channels, tunnels and tubular structures, which might be filled in a post process. The sole or insole may be completed by the machine or finished in a separate process and folded inside the completely finished upper.

In the embodiment shown in FIG. 8B, another appendage component can be a latticed structure (e.g., lattice cage structure 47) shaped into a secondary upper in the same knitting process. Each strip of the lattice structure is a separate finished appendage, with each strip joining regular or asymmetrical positions of adjacent strips, creating openings similar to windows in the secondary upper. The secondary upper or a portion of an upper, when finished, is folded against the completely finished upper 12. Portions of the completely finished upper may show through the latticed upper 47.

A completely finished shoe upper by the flat-knitting machine may have one or more aforementioned component appendages, which are created in the same knitting process and attached at one or more places, including the heel, toe, instep, eyelet 58 (FIG. 8E), ankle 59 (FIG. 8E), mid-foot sides, and sole.

The knitting process of a shoe upper may result in minimal hinging waste section 41 (FIG. 7A), which may be small enough to disappear into the shoe making process. Attached appendages typically require no additional sourcing, purchasing, color matching, warehousing, cutting, scrapping waste, bundling, coordinating or attaching.

Figure 8D:
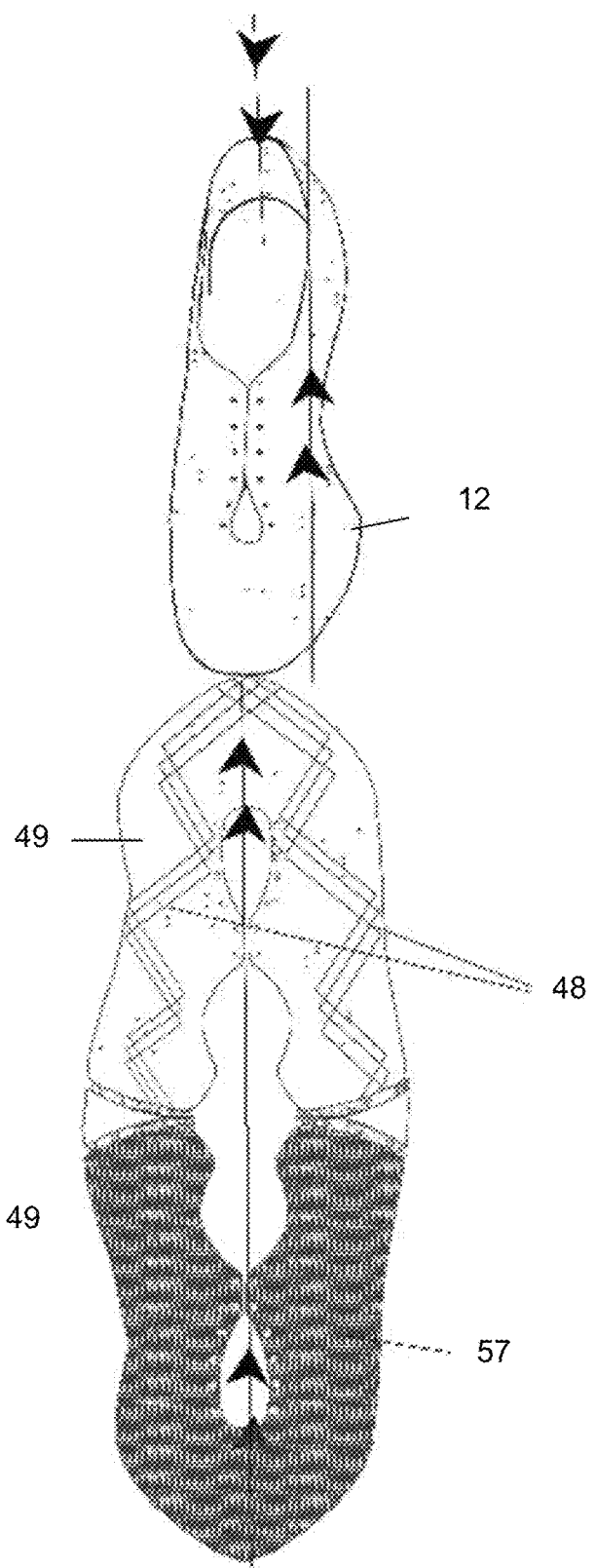
FIG. 8D is a diagram of an exemplary seamless weft knitted article of footwear with an integrated sub-assembly attached at the toe by using a knitting process and grain lines in accordance with an embodiment of the present disclosure.
Figure 8E:
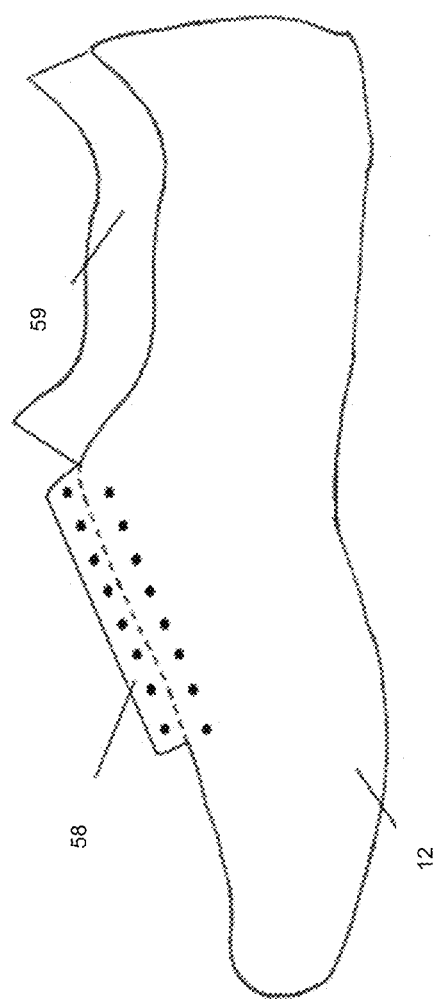
FIG. 8E is a diagram of an exemplary seamless weft knitted article of footwear with integrated eye stay aesthetic/reinforcement attached at instep opening by using a knitting process in accordance with an embodiment of the present disclosure.

Sub-assemblies may be integrated into the knitting process. FIG. 8D is a diagram of an exemplary seamless weft knitted article of footwear with an integrated sub-assembly attached at the toe in the same knitting process and grain lines in accordance with an embodiment of the present disclosure. This subassembly consists of two other layers 49 with examples of corresponding features, a wire feed warp reinforcing element layer 48 with an adhesive knitted into both faces of the respective layer, and a textured intarsia jacquard layer 57, each of the other layers is folded upon each other and seamed at the heel, then folded on top of the seamless upper. FIG. 8E is a diagram of an exemplary seamless weft knitted article of footwear with integrated eye stay aesthetic/reinforcement attached at instep opening the same knitting process in accordance with an embodiment of the present disclosure.

The upper body itself and/or the attached components may have one or more strands and incorporated parts aiding in securing the attached components to the upper, in the post process. These strands may be, for instance, adhesive strands, thermal adhesive, nonthermal adhesive, magnetic, or other suitable type of strand material. Such strands form connections between the body of the upper and an attached component.

The resulting upper structure advantageously may have one or more performance characteristics, is a stable structure, has no seams, and its seams are completely finished by the flat-knitting machine, with no human intervention. Each component is attached and directly corresponds to the shape and assembly of the upper. For example, the toe and heel appendages may require more abrasion resistance and incorporate an aramid material, which is folded in or on top of the body of the upper. The ankle area may incorporate a padded elasticated material and finished in a post process. The instep and mid-foot may incorporate a monofilament or a thermal plastic strand spanning the instep and migrating to both the toe and heel to stabilize the foot and hold the foot onto the sole in motion. An attached insole (e.g., 33 in FIG. 8B) may incorporate an auxetic material attaching to specific parts of the body of the upper. An attached sole may incorporate an FRP material, which is finished in a post process, but is linked to the body of the upper for stability. An attached outer sole may incorporate a heavy gauge monofilament or other rubberized, auxetic, or stiffening materials in building a knitted spring structure and or a composite material of fiber reinforced polymer, which is later processed. An attached heel flap (e.g., heel FRP 43 in FIG. 7B) may incorporate an additional aesthetic element with fiber optics or reflective materials. A combination of knit structure and incorporating the aforementioned 'cloaking' or radar-absorbent material may be knitted as an attached outer shell, encasing an inner shoe upper for structure.

Such an attached component directly corresponds to the upper, securing that it will be shaped and placed in the correct spot repeatedly and consistently in production. As shown in FIG. 7C, an attached sole 60 may be incorporated into the upper design, where the sole is attached as part of the heel structure for particular stability purposes, as shown in FIG. 7C. The sole may have a dimensional texture (e.g., sole 61 having a 3D texture created in the knitting process), such as a welt or other knit structure knitted into the sole appendage and the same material from the body may also appear in the sole and other appendages of the upper. The sole appendage material may incorporate a stiff material, a non-slip silicon material, or other materials or combinations of materials, which may be carried though a portion of or all of the upper body and appendages. A knitted sole appendage optionally may incorporate both a sole material and an upper body material, and wrap up and attach to the may body of the upper 62 completing the upper in a seaming or adhesive process.

Each zone of the upper may also include one or more performance or functional features and may have other shoe components integrated in a sub-assembly and attached to the upper in the knitting process, as shown in FIG. 7A. Each sub-assembly directly corresponds to the feature of the upper. Attaching the sub-assemblies and or other shoe components to the upper in the knitting process allows for consistent alignment of components and allows the same material lots to be maintained throughout the shoe assembly process. This can eliminate mismatched lots, variations in material, and assures that all parts were made on the same machine, with the same manufacturing calibrations.

The knitted upper attachments may include semi-finished and or fully shaped structure assemblies integrated in the knitting process, such as heel super and or sub structure, boot shaft, liner, insole assembly (33 in FIG. 8B), outer sole construction, under-upper layer (FIG. 8A), over layer upper (FIG. 8B), lacing eye stay super and or sub structure (FIG. 8E), and or closure assembly, ankle assembly (59 in FIG. 8E), tongue assembly components (FIG. 8A), lateral and or medial side panel super and or sub structure assembly, toe super and or sub structure assembly, and other semi-finished or fully shaped integrated upper assembly components (40 in FIG. 7A). The attached components may include structures such as for instance pockets, tunnels, channels voids, liners, and or other structures and or openings. Such structures and or openings on attached components and or sub-components may be ready to receive other materials, fillers, hardware, composites, electronics, padding material and or other additional materials.

According to embodiments of the present disclosure, a knitting machine is utilized to automatically place specific structures and materials where they need to be and to close or seal the edges. This can repeatedly and consistently eliminate cutting processes, material waste, and many sewing assembly costs. Many defects associated with cutting, sewing and assembling an upper can also be eliminated. Utilizing a knitting machine to automatically close or seal the edges eliminates seams, and incorporates functional design or pattern lines, or other specific performance features that otherwise require cutting and or sewing. A resultant shoe upper is advantageously free of sewing seam failures and free of pressure points pressing into a user's foot. All the edges of the upper are also finished, preventing unraveling and fraying.

Material strands utilized in knitting the upper body and or zones may be for example monofilament, multi-filament, staple yarn construction, slivers, core spun yarns or thread, air-tacked yarns, extrusion, pre-matrixed yarn constructions, copolymers, bi-components, woven yarn constructions such as chenille, laminated film, flat ribbonized structures, tube, synthetic film, onto which a metallic layer has been vaporized, fiber optics, conductive materials, carbonyl iron or ferrite coated strands, chain, braid, wire, or other strand-like compositions or combinations. The strands can be fed into the knitting machinery to create three-dimensional footwear uppers knitted to shape completely by the weft knitting machine. Variations of the same material may be used in the entire upper or a plurality of the parts of the upper. For example, a micro-denier polyester yarn, which is soft due to the high number of filaments in proportion to the yarn size, may be placed in areas next to the skin to avoid chafing. A polyester yarn with a stretch core may be used in the ankle area. A low filament polyester material may be used in the toe and heel areas for greater abrasion resistance. A polyester monofilament may be incorporated into the sole area. A thermoplastic polyester material may be incorporated into areas which require a reinforced structure to keep the foot on the sole. Here a homogenous polymer system as described above is utilized throughout, (upper, appendages, insole, outsole, thermoplastic material), and the entire shoe may be easier to recycle.

According to embodiments of the present disclosure, a knitting process can create a finished all needle double-bed footwear upper to a desired size and shape, ready for subsequent manufacturing process. The knitting process produces a shoe upper while eliminating the need for sewing seams and optimizing material savings. In some embodiments, the knitting process creates stable full gauge, double-bed fabric structures, by manipulating one or more double bed fabric stitch types across at least three needle beds to create an integrated structure, strength, shaping, and scrap savings. The knitting process can combine many more fabrication options than currently available two-dimensional fully fashioned uppers, three-dimensional semi-finished uppers, and three-dimensional sock like structures.

Figure 3C:
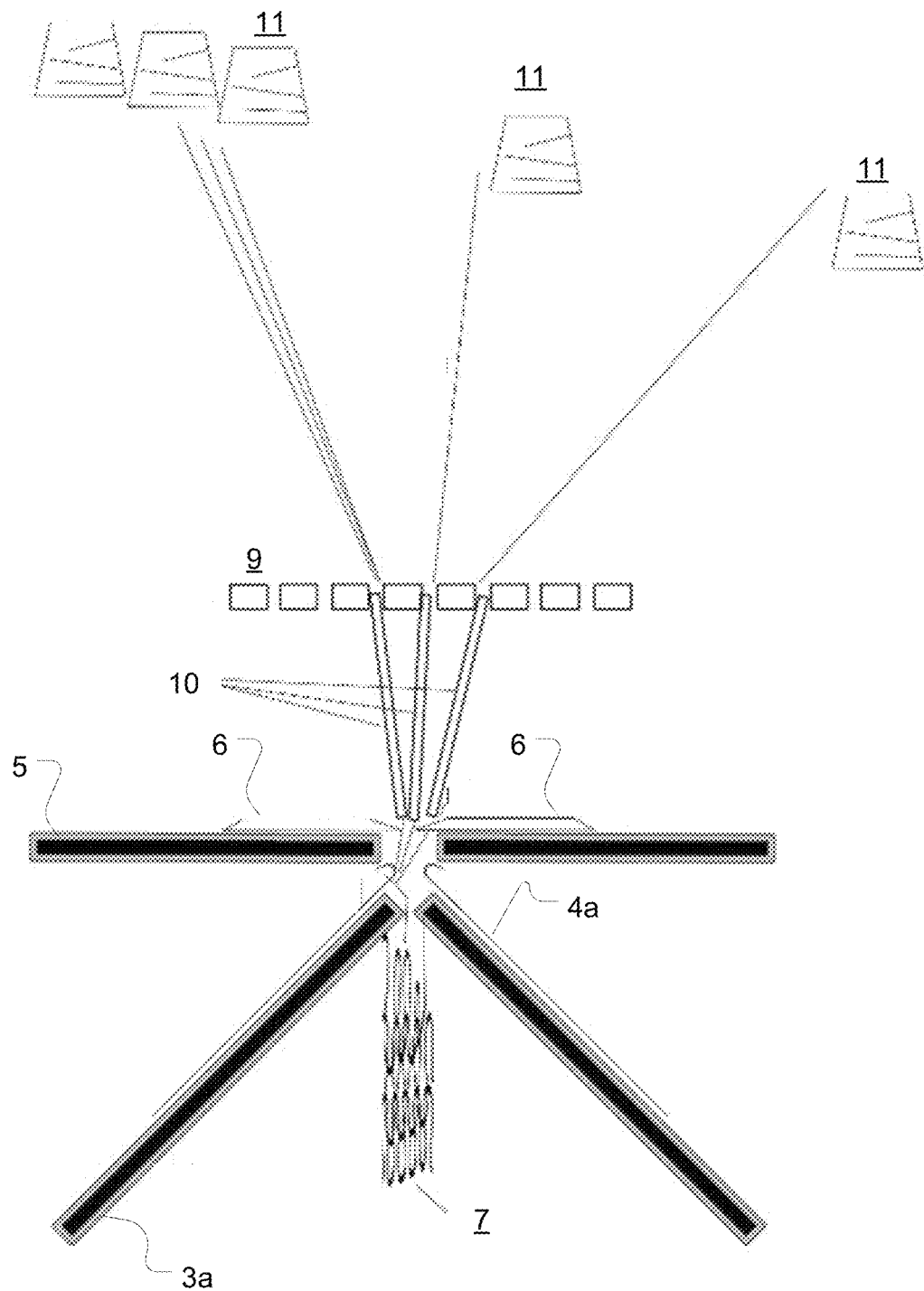
FIG. 3C is a side view diagram of the positioning of the needle beds and latch needles of a two-needle bed flat V-bed knitting machine with two additional auxiliary beds and transfer points, yarn rails, yarn feeders, yarn strand cone packages, and strands feeding into the machine.

In some embodiments, a seamless three-dimensional knitted uppers is manufactured in a unitary textile construction by using a 4 needle bed flat knitting machine, for example as shown in FIG. 3B and FIG. 3C. The machine has two auxiliary or alternate beds 5. There are fashioning points 6 or additional needles that allow for relocating stitches from the lower V-beds to another location or adding additional stitches. In weft knitting, loops are progressively built up in a fabric by converting the new yarn 8 being fed into in the needle hooks 4, into new rows of loops ("courses"). Each stitch can be a wale. Yarn 8 is fed into the machine by automatically pulling a plurality of strands of yarns 8 or other materials off a plurality of spools/packages 11 with the movement of the knitting machine feeders 10.

Specialized materials such as for instance carbon fiber, stainless steel, silicon, auxetic strands, reflective stands, aramids, para-aramids, magnetic strands, chain, metals, tubes, and other materials that are packaged on a spool, and 'unwound' off that package not to cause torque are fed into the machine by automatic unspooling device. Any suitable unspooling device can be used without departing from the scope of the present disclosure.

Figure 3D:
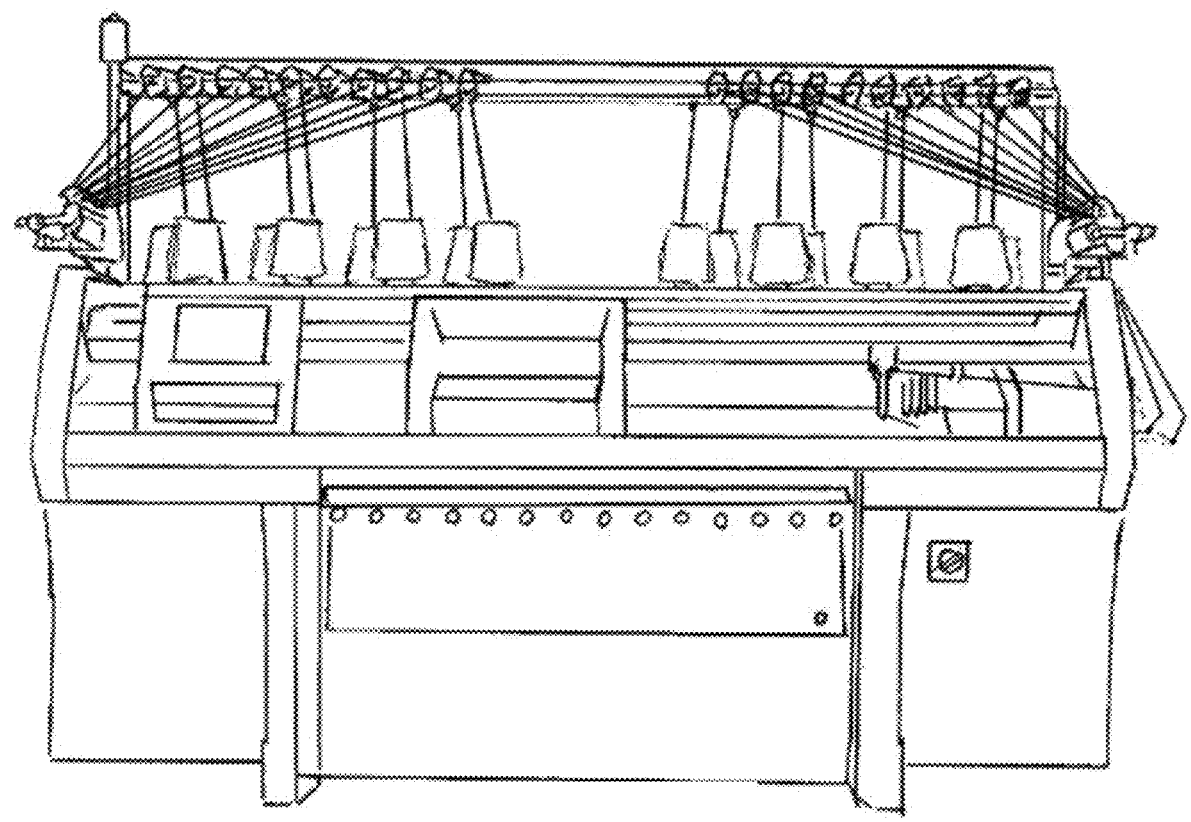
FIG. 3D is a front view diagram of an automated V-bed flat weft knitting machine.
Figure 3E:
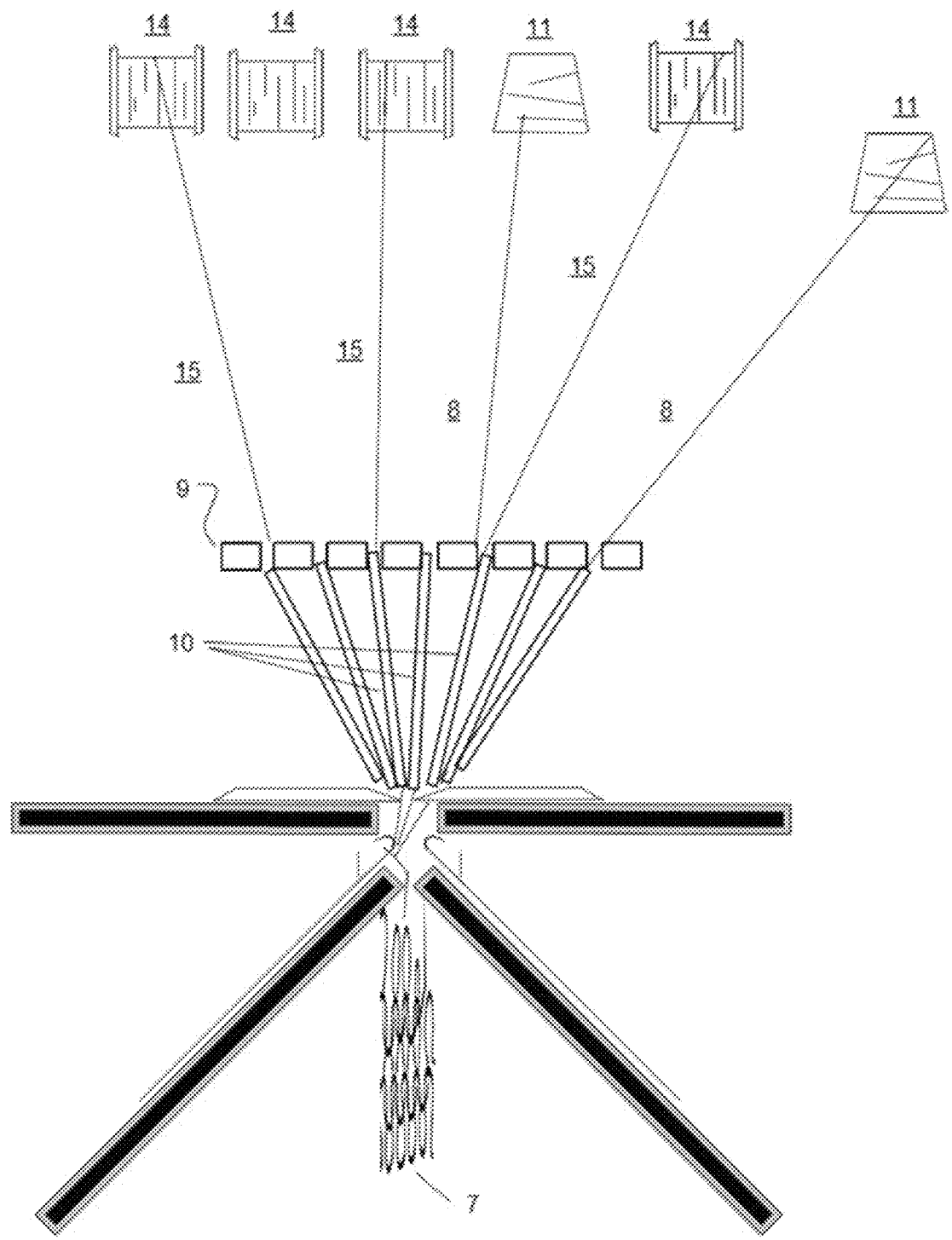
FIG. 3E is a side view diagram of the positioning of the needle beds and latch needles of a two-needle bed flat V-bed knitting machine with two additional auxiliary beds and transfer points, yarn rails, yarn feeders, yarn strand cone packages, strand spool packages, and strands feeding into the machine.

FIG. 3E is a side view diagram of the positioning of the needle beds and latch needles of a two-needle bed flat V-bed knitting machine with two additional auxiliary beds and transfer points, yarn rails, yarn feeders, yarn strand cone packages, strand spool packages, and strands feeding into the machine. One or a plurality of these unspooling devices may be mounted on one knitting machine (e.g., the machine shown in FIG. 3D), driving a plurality of strands of wire, metal atomized strands, fiber reinforcing materials, such as carbon fiber, aramids, para-aramids, auxetic, or other special performance strands of materials 15 pulled off a plurality of spools 14, cones 11, or other packages, using step motors and a stop motion system in coordination with the movement of the knitting machine feeder system 10. Moving along the feed rails 9, the pulled yarns (e.g., strands from cones 8) knit a plurality of courses to result in production of rows of fabric 7, which are shaped into a completely finished three-dimensionally knitted upper with no seams.

Figure 9A:
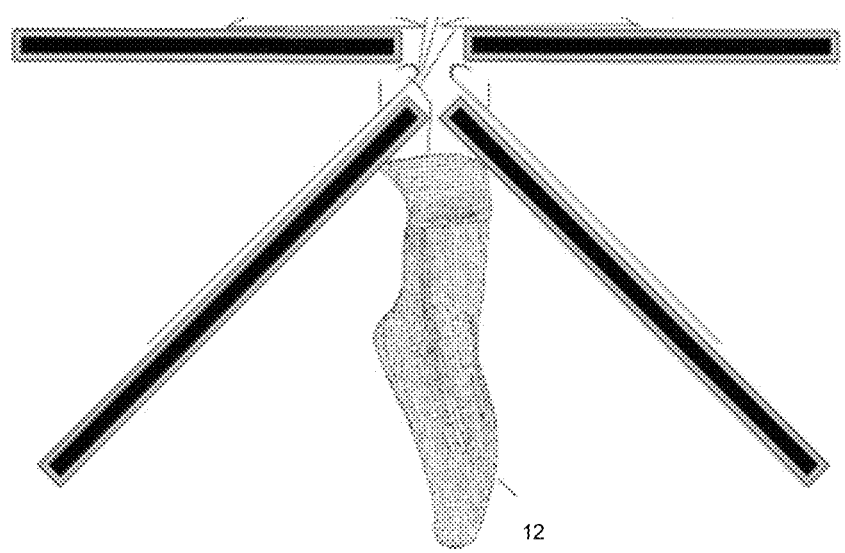
FIG. 9A illustrates an exemplary seamless upper emerging from the knitting machine in accordance with an embodiment of the present disclosure.
Figure 9B:
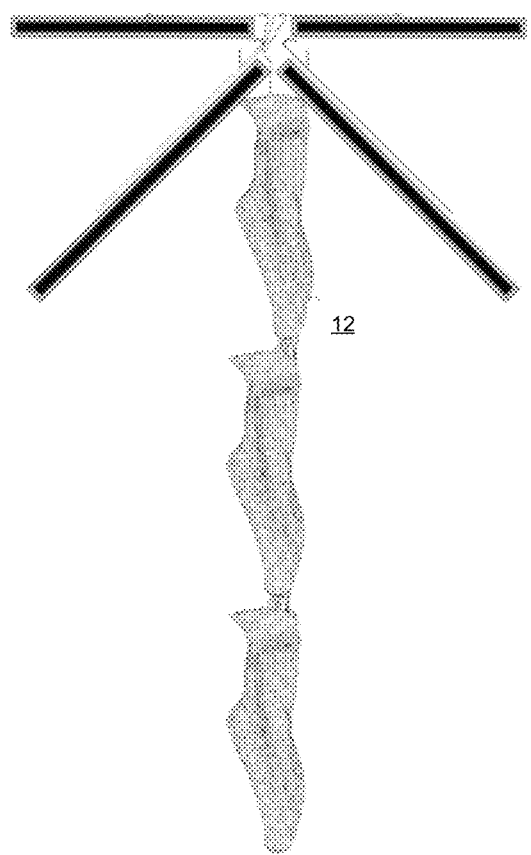
FIG. 9B illustrates an exemplary sequential series of essentially the same seamless uppers emerging from the knitting machine in accordance with an embodiment of the present disclosure.
Figure 9C:
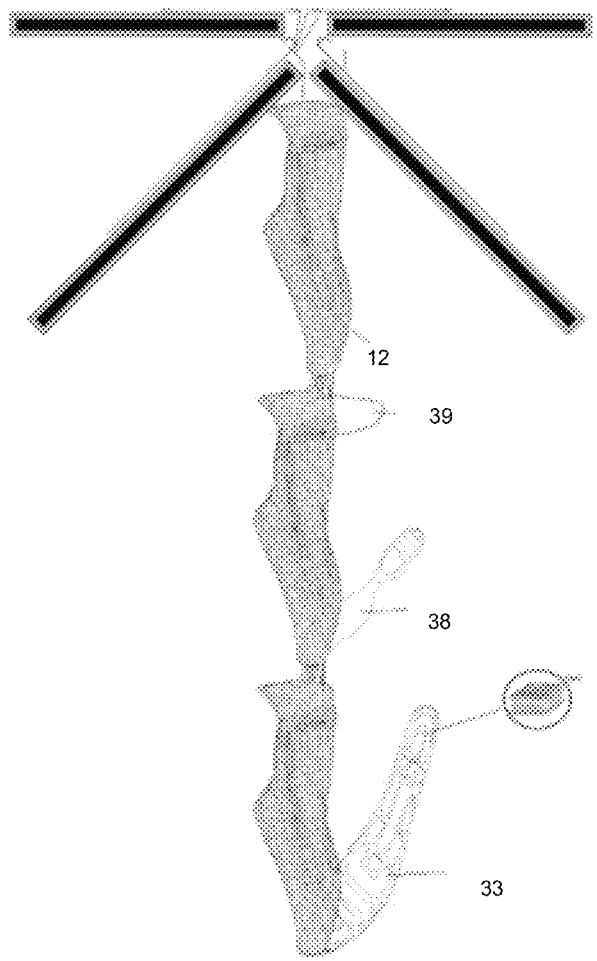
FIG. 9C illustrates another exemplary sequential series of differing seamless uppers emerging from the knitting machine in accordance with an embodiment of the present disclosure.

The knitting process may be performed by a computer controlled knitting machine (as shown in FIG. 3E for example) instructed by a pattern program in the knitting machine memory. FIG. 9A illustrates an exemplary seamless upper emerging from the knitting machine in accordance with an embodiment of the present disclosure. The machine memory system may also have instructions for automatically knitting additional substantially identical fully finished three-dimensionally knitted footwear uppers. Each subsequent upper may be linked or daisy chained together with a strand. FIG. 9B illustrates an exemplary sequential series of essentially the same seamless uppers emerging from the knitting machine in accordance with an embodiment of the present disclosure. Each upper in the chain is identical. FIG. 9C illustrates another exemplary sequential series of differing seamless uppers emerging from the knitting machine in accordance with an embodiment of the present disclosure. The uppers in the chain are different, for example including different appendages created in their respective knitting processes.

The same automatic unspooling device (as shown in FIG. 3E) can be utilized to create single or multiple strands of aesthetic or reinforcement material, horizontally, vertically, or diagonally in an upper, or portion of an upper, as shown in FIGS. 9B and 9C. These strands may be knitted, tucked, inlaid and or floated in an upper, upper layer, or portion of an upper. The seamless unitary construction of the upper guides the strands into the upper region, repeatably and consistently, with all edges finished and strands tacked in and ready for the shoe making process.

A computer controlled knitting machine utilized in embodiments of the present disclosure can be any type of knitting machine that is well known in the art. The knitting machine may be capable of high-speed intricate weft knitting techniques and operations. Optionally, the knitting machine can mechanically draw a plurality of strands from cones, spools and other material packaging (e.g., FIG. 3E), and manipulate the strands into the seamless three-dimensionally knitted footwear upper during a knitting process to form a predefined, three-dimensional shape footwear upper. For example, in one embodiment, the knitting process can be an intarsia knitting process in which multiple intarsia elements are knitted in knitting needles and then joined by auxiliary needle beds to form the various components and structures of the footwear upper, as shown in FIG. 6A.

The three-dimensional shape of a seamless footwear upper may include a concave or convex form disposed or located generally in the area of the instep and ankle, while also creating a void for inserting a foot. The three-dimensional shape also may encompass substantially planar and/or convex regions of the footwear upper sides and front, for example in the toe box top and mid-foot lateral and medial sides, all of which optionally may include knitted intarsia elements. The machine itself may be configured to interloop a plurality of first strands with a plurality of second strands, and any number of additional strands, so as to form the three-dimensional shape, combination of shapes, textures, and structures that all are part of or contribute to the shape of the seamless footwear upper. The machine also may mechanically manipulate other strands, or optionally the same strand, manipulating it through a plurality of sections of the upper construction, solely with the operations of a knitting machine during the knitting process to form the afore mentioned upper, consisting of generally curved, complex, and planar shapes in the complete footwear upper and/or three-dimensional convex shapes, edges, structures, cushioning, eyelets, rigid areas, stretch zones, appendages, assemblies and other knitted structures comprising the seamless three-dimensional footwear upper. The latter shapes can correspond generally with the heel, toe, instep, ankle and/or the respective edges or other portions of the footwear upper.

During the knitting process, the knitting machine knits a fully formed seamless footwear upper so as to form the respective components of the three-dimensional full-finished footwear upper with completely finished edges, requiring no seaming. For example, the knitting machine may knit the toe area, the instep, eyelet, ankle curve edges, and heel, then moves the stitches for the heel to an alternative needle bed and attaches the heel stitches to the corresponding sides of the heel edge. In this manner, the heel stitches may be formed horizontally (weft) and attached by the machine to appear approximately perpendicular to the body fabric, in order for the machine to close or seal the edges with knitting loops without seam. The heel area may incorporate a functional design, combination of strands, or pattern lines, for reinforcement, stress and strain management, an appendage component, or other knitted structures aforementioned.

Component appendages and or assemblies can be created in the same knitting process. For example, the configuration of an upper layer or any appendage may be knitted as a single face plush knitted fabric or a spacer (e.g., 34 in FIG. 8B). A spacer is a fabric having two single-faced fabrics facing each other; one made on one bed and the other (the reverse single faced fabric) made on the opposing V-bed. The two single fabrics are connected by an internal strand or combination of strands configured in "V" or "X" patterns of interlacing between the two faces. The two face fabrics are connected by tucking or knitting selected needles on each bed 34. The frequency and configuration of the "V," "X," "W" or any other pattern of interlacing between the two face fabrics correlates with the space between the face fabrics, otherwise known as cushioning.

Figure 10A:
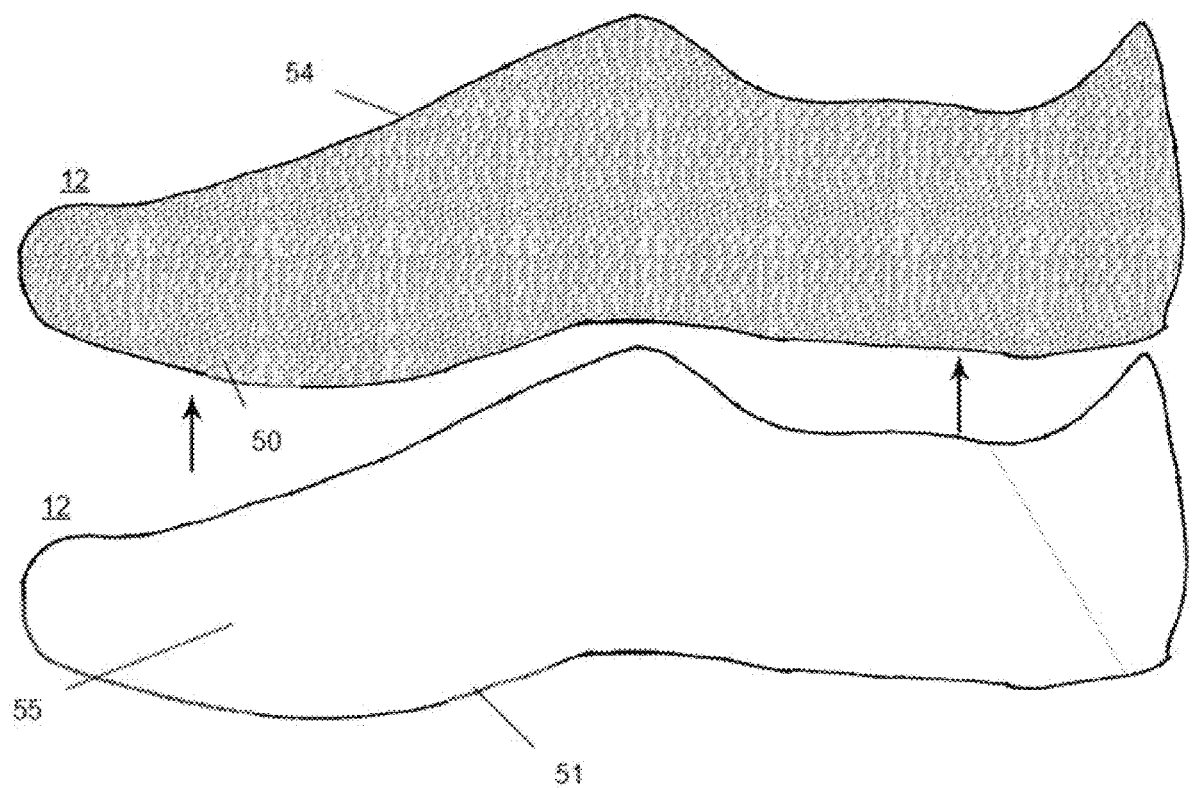
FIG. 10A is a diagram of an exemplary seamless weft knitted article of footwear with a second seamless weft knitted article of footwear with differing properties stacked to create one upper in accordance with an embodiment of the present disclosure.
Figure 10B:
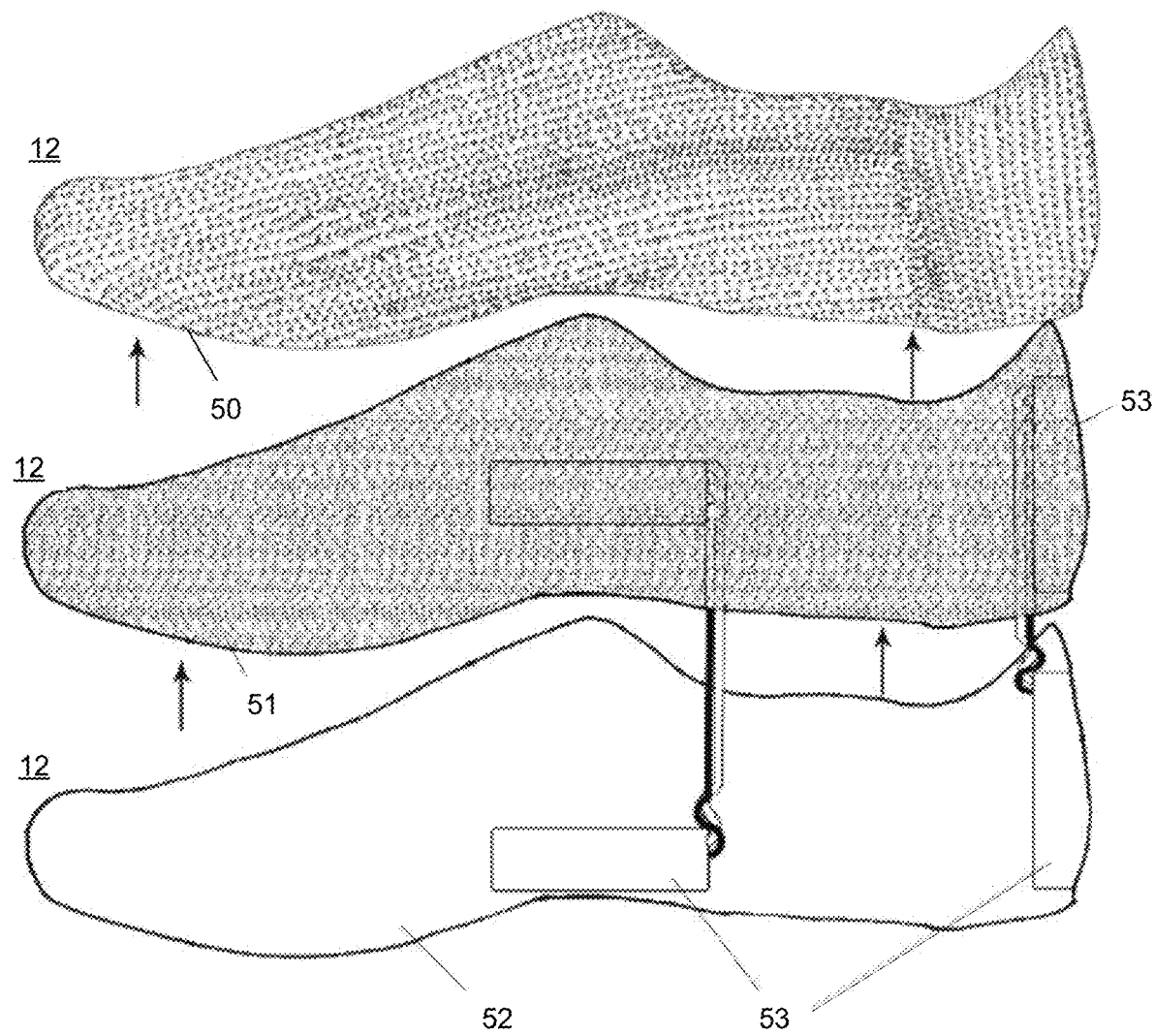
FIG. 10B is a diagram of an exemplary seamless weft knitted article of footwear with a second seamless weft knitted article of footwear and a third seamless weft knitted article of footwear in accordance with an embodiment of the present disclosure.
Figure 10C:
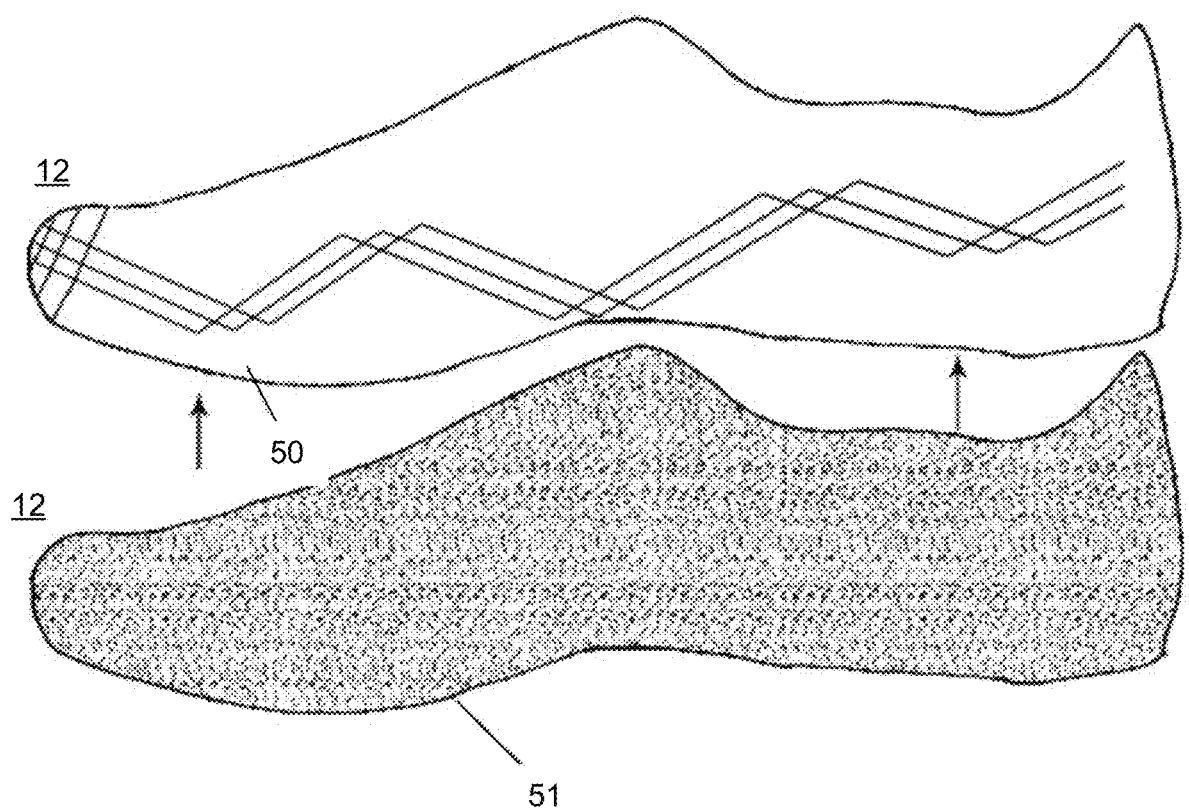
FIG. 10C is a diagram of an exemplary seamless weft knitted article of footwear with a second seamless weft knitted article of footwear with warped inlaid reinforcing strands in accordance with an embodiment of the present disclosure.

In some embodiments, the knitted construction may have a single layer or multiple layers, fashioned to a desired shape by the machinery, with no cutting, no seaming of the upper layers. FIG. 10A is a diagram of an exemplary seamless weft knitted article of footwear 50, corresponding to a second seamless weft knitted article of footwear (second layer of the stack) 51, the first seamless weft knitted layer (top layer of the stack) 50 is knitted with a stiff material 54 such as polymer reinforcing hemp, carbon graphene, jute, aramid, para-aramid, auxetic, wire, material or other such flex limited material; the second layer with differing properties, such as a microfiber 55; both layers are stacked to create one upper in accordance with an embodiment of the present disclosure. FIG. 10B is a diagram of an exemplary seamless weft knitted article of footwear with a second seamless weft knitted article of footwear and a third seamless weft knitted article of footwear in accordance with an embodiment of the present disclosure. Each layer having differing properties, and corresponding knitted dimensional structures which hold, share, and transfer electronic components. The layers can be stacked to create one final upper. FIG. 10C is a diagram of an exemplary seamless weft knitted article of footwear with a second seamless weft knitted article of footwear with embedded warped reinforcing strands and or conductive materials knitted in the same knitting process as the respective upper layer 50 in accordance with an embodiment of the present disclosure. The uppers can be stacked to create one final upper.

There may be several layers making up an upper. As shown in FIG. 8D, the additional uppers are stacked inside each other, e.g., each having specific performance or aesthetic characteristic. The additional layers 49 may be attached in the same knitting process, as in FIG. 8A. Alternatively they may be individual uppers, acting as separate components to create one upper. In FIG. 8D for example, one layer embodies a base material and several warp inlaid strands 48, which may be incorporated for aesthetic, reinforcing, or functional purposes. Aesthetic purposes may include incorporating reflective materials. Reinforcing purposes may include incorporating a strong fiber with minimal stretch such as Kevlar or Ultra-High-Molecular-Weight-Polyethylene (UHMWPE). Functional purposes may include conductive or dissipative materials. The upper is layered with an outer layer 49, which may embody a desired aesthetic, and a seamless inner layer 12, which may contain an anti-microbial function.

In some embodiments, the knitted construction may have a single layer or multiple layer fully-shaped appendage reinforcement areas, which are completely fashioned to a desired shape by the machinery, with no cutting, and only minimal seaming and trimming of the upper or upper layers, for example as shown in FIG. 8A. In some embodiments, the configuration may be knitted as an attached, but separately shaped, toe aesthetic or reinforcement shape with a performance or aesthetic strand, aramid or para-aramid strand and/or a strand combined with a thermoplastic adhesive strand, where the shape and or shape assembly is connected to the toe region of the upper and is folded over or under the fully shaped three-dimensional footwear upper body (e.g., as shown in FIG. 7B) and assembled in a post process related to the shoe making process.

In some embodiments, the configuration may be knitted as an attached but separately shaped eyelet area(s), which may have an aesthetic or reinforcement type shape with a performance or aesthetic strand, aramid or para-aramid strand and/or a strand combined with a thermoplastic adhesive strand, where the shape and or shape assembly is connected to the eyelet region of the upper (e.g., as shown in FIG. 8E) and is folded over or under the fully shaped three-dimensional footwear upper body and assembled in an after-process related to the shoe making process.

In some embodiments, the configuration may be knitted as an attached but separately shaped heel (e.g., 43 in FIG. 7B), which may have an aesthetic or reinforcement type shape. The heel may include a performance or aesthetic strand, aramid or para-aramid strand and/or a strand combined with a thermoplastic adhesive strand, where the shape and or shape assembly is connected to the heel region of the upper and is folded over or under the fully shaped three-dimensional footwear upper body and assembled in an after-process related to the shoe making process.

In some embodiments, the configuration may be knitted as an attached but separately shaped ankle, which may have an aesthetic or reinforcement type shape with a performance or aesthetic strand, aramid or para-aramid strand and/or a strand combined with a thermoplastic adhesive strand, where the shape and or shape assembly is connected to the ankle region of the upper and is folded over or under the fully shaped three-dimensional footwear upper body and assembled in an after-process related to the shoe making process.

In some embodiments, the configuration may be knitted as an attached but separately shaped lateral and/or medial mid-foot region, which may have an aesthetic or reinforcement shape and or shape assembly, which may include a performance or aesthetic strand, aramid or para-aramid strand and or a strand combined with a thermoplastic adhesive strand, where the shape and or shape assembly is connected to the lateral and or medial mid-foot region of the upper and is folded over or under the seamless three-dimensional footwear upper body and assembled in an after-process related to the shoe making process.

In some embodiments, the configuration may be knitted as an attached but separately shaped sole/insole which may be knitted to shape with a performance, cushioning, or aesthetic strand, aramid or para-aramid strand and/or a strand combined with a thermoplastic adhesive strand, where the sole/insole shape and or shape assembly is connected to a point on the bottom portion of the main upper, which could be a toe, heel or side bottom region of the upper and this sole or insole shape and or shape assembly is folded over or under the fully shaped three-dimensional footwear upper body and assembled in an after-process related to the shoe making process.

In some embodiments, the configuration may be knitted as an attached but separately shaped full upper liner and or liner assembly, which may have an aesthetic or reinforcement type shape with a performance or aesthetic strand, aramid or para-aramid strand and/or a strand combined with a thermoplastic adhesive strand, where the shape and or shape assembly is connected to the bottom sewing edge region of the upper and is folded over or under the fully shaped three-dimensional footwear upper body and assembled in an after-process related to the shoe making process.

In some embodiments, the configuration may be knitted as an attached but separately shaped strap, tab, closure system, webbing or other shaped appendage and or appendage assembly, which may have an aesthetic or reinforcement type shape with a performance or aesthetic strand, aramid or para-aramid strand and/or a strand combined with a thermoplastic adhesive strand, where the shape and or shape assembly is connected to a point on the upper and is folded over or under the fully shaped three-dimensional footwear upper body and assembled in an post process related to the shoe making process.

Embodiments of the present disclosure advantageously enable manufacturing a three-dimensional, fully-shaped, seamless footwear upper that is one or more double-bed fabrics throughout with no cutting or sewing. Comparing to manufacturing a cut and sew processed upper, a two-dimensionally shaped knitted textile upper, a semi-finished three-dimensionally knitted textile upper, manufacturing a footwear upper according to embodiments of the present disclosure advantageously significantly simplifies the upper manufacturing process, which leads to reduced labor cost and material waste.

According to embodiments of the present disclosure, a three-dimensional footwear upper can be readily and easily made as light weight and may mix various stitch types in the same footwear upper. A three-dimensional footwear upper can be strengthened and or reinforced by incorporating additional materials in double-bed fabrications in locations such as heel, toe, eye lace stay, mid-foot, ankle, sole and other areas to provide structure. Such double-bed fabrics may be Milano, half-Milano, jacquard, spacer, pique, spacer, cross-linked tubular jacquard, cross bed tubular structures, welt, interlock, pique, double faced, and other such fabrications using two needle beds. Fashioning features may be added to various areas of the upper by moving of stitches between one or more beds. Such double-bed fabrics may include various supportive materials such as mono-filaments, multi-filament, or staple yarns, which add additional structure, reinforcement, or may be activated in post-processes. By creating, and possibly attaching, additional component appendages in the same knitting process, the requisite sourcing, warehousing, process, assembling, bundling and coordinating for the shoe making process are remarkably reduced. This contributes to less labor, cost, and waste.

The present disclosure describes a process of manufacturing an article of footwear, which is entirely finished by a weft knitting machine. The fully shaped one-piece upper may include one or more layers of single and or double-bed fabric, which are produced and completely and fashioned by using at least three needle beds of a flat-knitting machine. The present disclosure also describes a process of manufacturing a multi-component article of footwear, comprising finished or semi-finished components (assembly structures), which are shaped and or attached by the flat-knitting machine in the knitting process. A complete upper may also include multiple footwear upper components which are created entirely by the flat knitting machine (e.g., FIG. 3D), and integrated or attached by the knitting machine as part of the knitting process.

In some embodiments, an upper can be knitted in multiple layers by using two or more fully finished seamless uppers, for example with differing performance configurations. This may be advantageous for aesthetic, functional, or manufacturing purposes. For instance, knitting an entire upper of a stiff material (such as carbon fiber, aramid, flame retardant or other extreme performance material) as an outer layer, and then knitting an additional upper from a microfiber or other more material which is softer on the skin or thermally insulating. By creating multiple upper shells of varying performance characteristics and then stacking them in the shoe manufacturing process, feature alignments can be advantageously improved.

In certain circumstances, eliminating seams while also using all-needle knitting to create an upper can also provide desired technical smart-fabric benefits. In some embodiments, special materials are integrated into the knitting process and combined with seamless knitted structures in two or more adjacent layers of the knitted material in an upper construction. The shoe upper may be configured with electronic functions and components. For example, as shown in FIG. 10B, the electronics devices are located in one or more pockets 53 knitted into one layer (third layer of the stack) 52. The electronic devices are capable of interacting with the interior or exterior of one or more other layers 51 of a stacked upper. Thus, the stacking of uppers may provide additional performance characteristics in addition to holding a foot in motion.

For example, magnetic strands are used in knitting one layer or portion of an upper, and ferrofluid coated strands are used in knitting another layer or portion of an adjacent upper. When aligned together and activated, the resultant upper can function as a system operable to guide or absorb radio frequency waves, thus changing how the upper appears in a radar scan. Other materials may be combined similarly in an upper construction to guide, absorb, or reflect electro-magnetic waves and light waves.

More complex three-dimensional seamless uppers can be made according to embodiments of the present disclosure, such as those that include composite matrix materials in all or a portion of the upper (e.g., 43 in FIG. 7B); those which require ballistic protection, water repellency, RF shielding, electronic frequency (EF) and/or radio frequency (RF) shielding; or those which require electronics, heating and cooling or other conductive, shielding, or dissipative performance characteristics. Such a complex three-dimensional seamless upper may be composed of a variety of materials knitted into specific areas, attached appendages, and or layers as needed for specific performance or aesthetic purposes.

For example, in one configuration, the toe and heel areas may incorporate composite or aramid materials for ballistic protection (e.g., toe reinforcement 42 in FIG. 7B). An upper may also incorporate conductive materials for heating and cooling of the foot. An upper may also incorporate fiber optics. An upper may also incorporate magnetic materials to react with a ferrofluid coated strand to affect a 'cloaking' or radar-absorbent performance. An upper may also incorporate electronic sensors, RFID, as well as shielding. Each zone with a particular feature can be knitted to shape (including any appendages), and the knitting machine fully integrates or semi-finishes the required material into the upper, which is fully formed by the machine. Any composite or matrixes of materials can be later activated or resinized in a post process machinery step. Additional electronic power supply, sensors, PCB, connectors and/or other electronic support assemblies, which do not fit into the material feed systems of the knitting machine, may be attached in post processes. In some embodiments, the pockets, channels, tubes, and structures required to hold the electronics may be knitted into the upper or several layers of uppers (e.g., shown in FIG. 10B).

The conventional manufacturing process for fiber-reinforced-polymer composite materials includes bonding two or more homogenous materials with differing material properties, to derive a final product with certain desired material and mechanical properties. Fiber-reinforced polymers ("FRP") are a category of composite materials that specifically use fiber materials to mechanically enhance the strength and elasticity of polymer matrices. Typically, these composites are woven or non-woven fabrications, where the fabrication or weave pattern is essentially the same throughout the two-dimensional panel. The large two-dimensional panels are later cut in a post process and subjected to heat and pressure to form the three-dimensional shape. Any additional structure elements or reinforcement elements are layered onto the woven panel with a sub-assembly process prior to forming the upper or in an additional post process. The process of cutting carbon fiber components and other FRP materials requires large, specialized cutting systems with special cutting tooling. Most of these cutting processes are only suitable for cutting two dimensional panels. Fibers splinter off in the process resulting in sharp edges, loose fibers in the atmosphere and on surfaces, which must be removed, and sometimes inconsistent rough cuts.

According to embodiments of the present disclosure, a three dimensionally shaped, fiber reinforced polymer composite matrix footwear upper can be produced by utilizing a knitting machine, and with no human intervention to cut, shape, and or prepare the material for the molding process.

A three-dimensionally V-bed knitting process can create multiple structures in the same panel, digitally programming specific structures of differing construction, varying thickness, and may also deploy varying resin impregnated materials. Multiple types of fibers may also be utilized in the same knitting process, including for instance coated, enameled, wrapped, shielded, and other types of wire assemblies. Openings, pockets, appendages, sub structures and liners can also be knitted in the same knitting process. Appendage, liner, or reinforcement structured fabric can be aligned and pressed together into zones, with or without the addition of an adhesive and or thermoplastic strand to constitute a strategically plied group of layers or zones to create the three-dimensionally shaped seamless unitarily constructed footwear upper.

Referring to FIG. 7A, the upper construction may include separate smaller components by knitting in separating strands (e.g., live hinge 44) to connect successive layers of a three-dimensionally shaped footwear upper. Flex joints, live-hinges, waste areas, buffer material, and other structures may be used to make the resulting upper appendages and zones fold, flex, and bend like an accordion. In this way, the upper construction is ready for pre-stacking (lay-up) in the composite fabrication process. Where a portion of the upper is knitted with a dry reinforced fiber, or a pre-resinized fiber is knitted to the required shape of the mold, (typically this is the appendage), a buffer material may be knitted between the components to protect the rest of the upper structure from the heat of the composite post process. For example, the buffer material may be Kevlar, which is heat resistant to 600 degrees Fahrenheit, or a sacrificial yarn which evaporates or melts away with heat.

Should a wire or electronic component need to be embedded into the upper during the knitting process and additionally protected and or secured during the composite post process, specific materials (such as Kevlar, ceramics, or other materials) may create an internal liner pocket, pouch, tube, and or cushion to withstand the applied environmental elements of the post process, and thereby protect the electronic component or wiring.

There are numerous methods for fabricating composite components to meet specific design or manufacturing challenges faced with fiber-reinforced polymers. Selection of a method for a particular upper performance characteristic, therefore, will depend on the materials, the upper design and function, shape, and or application. According to embodiments of the present disclosure, an upper can be made ready to shape for the composite process.

After the knitting step (and optionally with the use of fiber-reinforced composite uppers or components and resinizing process), any appendages which are destined for the interior of the upper are folded inside, secured and in many cases finished. Any appendages which are destined for the exterior are folded onto the upper surface, secured and in many cases finished. If there is an attached knitted insole construction, (e.g., FIG. 8A), the component is pushed inward into the upper. Any sole components are pushed outward.

The fully shaped upper is then slip lasted, or attached onto a liner (e.g., Strobel) material, effectively closing the bottom of the shoe during the lasting process, and bottomed with a sole structure, which may also have been attached in the knitting process, heated, and cured. This forms the completed shoe.

Embodiments of the present disclosure can advantageously eliminate the cutting process, optimize efficient use of materials while lessening scrap, greatly reduce the stitching steps over a semi-finished upper, minimize the potential of human error associated with managing the material supply chain in the production process, align related components as attached assemblies, and create a strong double-bed fabricated shoe as compared to current half-gauge upper constructions. By creating a finished double-bed shoe upper in three dimensions, an integrated knitting process according to embodiments of the present disclosure can advantageously eliminate many steps as used in the conventional shoe manufacturing process, and greatly reduce additional materials needed to complete and strengthen a semi-finished upper or half-gauge upper assembly. By knitting all the appendages as attached assemblies, retooling of the manufacturing process can be significantly reduced, and costs associated with creating new designs and varying shoe configurations are also reduced.

In some embodiments, the computer program that controls the knitting process is reconfigured for each change in design and a separate graded program is used for each desired shoe size. Similarly, rather than warehousing and maintaining many ready-made materials, fabric, foams, and liners to create upper sub-assemblies, solely upper material yarns ("strands") are kept in inventory to accommodate desired changes in style.

From the perspective of manufacturing, utilizing multiple materials of differing properties and performance features, and then cutting, sewing, and constructing them into an article of footwear, can be a wasteful, labor intensive, and inefficient practice. For example: the various materials utilized in a conventional upper may be obtained in a variety of widths, lengths, thicknesses, densities, and packaging arrangement. The materials may be from a single supplier or many suppliers all over the world. Accordingly, a manufacturing facility must coordinate, inspect, inventory, and stock specific quantities of ready-made roll good materials ("yardage"), with each material being a static design created by suppliers that may have distinct seasonal and trend perishability. The various raw good materials may also require additional machinery to prepare, inspect, or they may require sub-assembly line techniques to cut or otherwise prepare the material for incorporation into the footwear. In addition, incorporating separate materials into an upper may involve a plurality of distinct manufacturing steps requiring significant planning, staging, labor, space, and resources to integrate into the manufacturing process, then collect and dispatch the scrap.

Weft or V-bed knitting a fully shaped three-dimensional footwear upper with completely finished edges needs stocking of yarn and or strand materials only. The fabric is created at the same time as the product is knit, with only a few strands of waste (sacrificial strands). The designs, colors, textures, jacquards, performance characteristics, and any combinations of options may be changed at will by manipulating the computer program. Attaching appendage components in the three-dimensional knitting process, such as inner sole, toe reinforcement, heel attachment, and/or including the sole assembly needs stocking of yarn and or strand materials only and assures matching material lots are used throughout the knitting process in an efficient, consistent, precise, and repeatable manner.

In some embodiments, a seamless flat knitted upper may be knitted as a single unit (e.g., as shown in FIG. 9A), or one of a strip of connected uppers (e.g., as shown in FIG. 9B) that are daisy-chained-together sequentially with a minimal waste segment separating them. Multiple uppers with various sizes and configurations may be knitted one at a time or as a strip of daisy-chained sequentially knitted uppers.

All of these shaped knitted components and or assemblies of a seamless knitted footwear upper are formed contiguous and continuous with one another, being formed from the plurality of strands that make up the unitary textile material. Indeed, many of the individual strands can span the length of the footwear upper from the toe to the heel and can be inter-looped in specific regions of the footwear upper, thereby forming and becoming integrated with the varying knit patterns of the footwear upper. Thus, as one example, a knitting machine can interloop a first strand with a second strand near the toe. The first strand can continue into a vertical element through the eyelet and ankle area. In the ankle area, that strand can be inter-looped or combined with additional strands within the knit pattern to form cushioning. The same strand can extend into and be inter-looped with yet other strands to provide reinforcement in the knit pattern in the heel. The same strand can extend along the entire footwear upper with minimal waste. This method of manufacturing reduces the wastage of the elemental yarn materials, by utilizing the same yarns throughout the knitting process, creating completely finished edges of the shoe upper, requiring no cutting, sewing, or trimming of the upper, and having nearly zero waste.

As mentioned above, a knitting process according to embodiments of the present disclosure produces the entire body of a footwear upper in a unitary construction being fully shaped, seamless and three-dimensional. The body in the unitary construction includes mid-foot, lateral and medial sides, heel, ankle areas, respective ankle curves and as well as the varying components of the footwear upper in their zones with their respective structures and patterns. The entire footwear body can be formed in an automated manner, without any direct manual, human manipulation of any strands in the upper.

The unitary construction of the fully shaped three-dimensional footwear upper's material fabric and/or knit configuration, and in particular its multiple strands, can be mechanically and automatically manipulated to provide varying knit patterns. During the knitting process, the knitting machine effectively knits a plurality of strands individually and/or collectively so as to form the varying regions of the fully shaped three-dimensional footwear upper in a unitary construction, for example, the first knit region of the toe, the second knit region the instep, the eyelets, the curved edges of the ankle, the heel and/or heel attachment area, as well as the manipulates the end stitches of the heel to attach to the corresponding opposite side.

In some embodiments, a majority of the mid-foot and toe regions can be weft knitted, and can include multiple structural elements, such as vertical tubular, horizontal inlay, vertical inlay elements, and eyelets as described above. The knitting machine creates all of these plural components and patterns in an automated process using multiple needles through which the yarn, filament, inlay, extrusion or other element are dispensed and included in the fully shaped three-dimensional footwear upper. Effectively, the plurality of strands are put in place via mechanical manipulation of the respective needles of the knitting machine, within the three-dimensional footwear upper. None of the strands are subject to direct manual human manipulation to form the upper body, nor are any of its three-dimensional shapes, shape assemblies, and or components.

The knitting machine can be configured to receive a plurality of strands, which are spooled on respective cones or other material packaging. The individual cones, also referred to as spools herein, and varying strands can be constructed from a variety of materials as further explained below, depending on the particular attributes and mechanical and/or physical properties of the three-dimensional footwear upper in certain regions. The respective cones each can be mounted in such a way that the knitting machine can draw in stands of the material from the respective cones.

In some embodiments, the V-bed knitting machine can include a plurality of needles on several needle beds. These needles can be manipulated and controlled by actuating mechanisms further controlled by a controller. The controller can have preprogrammed knitting patterns stored in memory. A user can select and/or program the controller so that it directs the actuating mechanisms and thus the respective independent needles to knit the strands in a particular pattern and/or within a particular region.

Throughout the knitting process, the knitting machine may knit varying regions and one or more stitch patterns. As mentioned above, it can knit a first pattern, a second pattern, and successive patterns, forming the shaped structure of the upper therein, as well as the toe, toe cap, vamp, instep, tongue, eyelets, as well as the ankle pattern, boot shaft, heel, heel cap, medial side panel, lateral side panel, all regions, and assemblies needed to cover a foot. In constructing the varying stitch patterns, the knitting machine can change the densities of various elements. Particularly the machine can change the number of strands, courses ("rows") and/or wales ("stitches") in a given region as well as in adjacent, opposing, supportive, or other regions that make up the three-dimensional footwear upper. For example, the knitting machine can manipulate the strands so that the density of strands in the perimeter edge is less than the density in the mid-foot region and other regions so as to accommodate easier sewing. The density of strands in the heel area can likewise be greater than the density in the mid-foot and other regions, to accommodate stiffness for keeping the foot from rolling off the sole. The eyelet area can have a strand density that is greater than the mid-foot region, but perhaps similar to the density in the heel elements to help with lace wear and abrasion. With these varying densities, some regions of the three-dimensional footwear upper can be more or less densely knitted compared to other regions. This can provide desired mechanical and/or physical properties of the three-dimensional footwear upper in those specific regions, and/or across the three-dimensional footwear upper. For example, where it is more densely knitted, the three-dimensional footwear upper can be more robust and rigid, limiting stretch. Where it is less dense, the three-dimensional footwear upper can be suppler, exhibiting stretch and recovery.

In some embodiments, these characteristics of suppleness and rigidity can be altered in the three-dimensional footwear upper to accommodate when the upper is connected to a sole. In some cases, the upper can be stretched more in certain regions than in others, which can either increase or decrease the rigidity and/or suppleness of the three-dimensional footwear upper in the plurality of regions and within the varying knitted stitch patterns.

The three-dimensional footwear upper can include a variety of components, assemblies, sub-assemblies, appendages, interior and exterior regions that are constructed from one or a plurality of strands of one or more materials having varying properties and or stitch densities. To create such a three-dimensional footwear upper, the knitting machine can be set up so that the varying spools of material include appropriate amounts of continuous strands of a first material and a different second material, and perhaps many varying materials. In some cases, the first material can be less elastic and more abrasion resistant and durable than the second material. One may be cut resistant, or thermoplastic, or embody other performance characteristics. Of course, the different materials may be constructed so that they have other particular mechanical, thermal, smart 'e-textile"), elastic, and/or properties. As an example, a strand of a first material, for example an ultra-high-molecular-polyethylene ("UHMWPE") can be placed on the first spool. Strands of a second material, for example thermoplastic polymer can be placed on spools. The knitting machine can pull strands from the first cone or spool and construct the toe area, the mid-foot area and/or the ankle area with this plurality of strands. The knitting machine can separately pull the strands of the second material off the cones or spools, respectively, and interloop them with the first strand. Thus, the strands in certain regions can be of one material or a combination of strands, which can be interloped and connected directly with strands of the second material or combination of strands in predefined locations.

In some embodiments, an automated footwear upper assembly machine described herein (e.g., the Stoll CMS MTB knitting machine) can be configured to mechanically manipulate a strand drawn or pulled from a particular spool to form a predefined three-dimensional shape in a first unitary fully shaped three-dimensional footwear upper. This first strand can be constructed from the second material, for example a thermoplastic polymer. The machine also can make a second fully shaped three-dimensional footwear upper body joined with the first fully shaped three-dimensional footwear upper body, where both the first and second fully shaped three-dimensional footwear upper bodies are constructed primarily from the strand of the second material. If desired, the machine can be coupled to spools of other types of strands such as those constructed from the first material, for example an elongated aromatic polyamide strand. The automated machine also can interloop or otherwise join one or more strand of the first material with one or more strand of the second material.

All the strands can be used to form the knitted patterns of the toe, as well as the knitted pattern of the heel, including the mid-foot and the ankle area. The strands of the first material, however, as mentioned above, can be used to manufacture the respective edges around the foot bottom of those components. The edges, constructed from the plurality of strands of the first material, can interface or transition to the other components such as the second knitted pattern for sewing ease, a third pattern for ankle cushioning, or a heel pattern for reinforcement. At the edges, the strands of the first material can be interloped and interlaced directly with the knitted strands of the adjacent region of the second material. To achieve this, different needles of the machine can feed and interloop the different materials in the respective different locations, and one of two needle beds and transfer cams may move stitches from one area to another; one of two additional and alternative needle beds may attach loops from one location of fabric structure to another. After a fully shaped three-dimensional footwear upper is completed by the knitting machine, it can be removed from the knitting machine and later joined with a liner and a sole configuration in a desired manner as described herein.

In some embodiments, the knitting machine can be programmed or otherwise configured to generate individual self-contained fully shaped three-dimensional footwear upper, or a daisy-chained strip of fully shaped three-dimensional footwear uppers including first, second, third, and more, complete seamless three-dimensional footwear uppers, each knitted in a manner similar to that described above.

As an example, the machine can knit a first fully shaped three-dimensional footwear upper, second fully shaped three-dimensional footwear upper, and third fully shaped three-dimensional footwear upper, or any other number of fully shaped three-dimensional footwear upper (e.g., as shown in FIG. 9A). In some embodiments, each three-dimensional footwear upper knit pattern may be different from the patterns of the respective subsequent three-dimensional footwear uppers (e.g., as shown in FIG. 9C). Of course, the patterns can be changed to be similar to those of the respective initial three-dimensional footwear upper if desired within the edge interface as well.

In some embodiments, the knitting machine, or other automated footwear assembly machine, can be controlled by the controller to produce the daisy-chained strip of fully shaped three-dimensional footwear uppers. The controller can be any conventional processor, computer or other computing device. The controller can be electrically coupled to the machine, and can be communicatively coupled to a memory, a data storage module, a network, a server, or other construct that can store and/or transfer data. That data can be any particular type of data related to footwear uppers, such as: footwear design configurations, knitted stitch type preference data, brand upper configuration preference data, available color/feeder/yarn selection data, image options, logo, text, graphics, available stitch types, style options, appendage options, size grade options, and other variations of footwear uppers. For example, the data can be first fully shaped three-dimensional footwear upper data pertaining to one or more particular knitting patterns or other patterns associated with and/or incorporated into the fully shaped three-dimensional footwear upper. The fully shaped three-dimensional footwear upper data can be implemented, accessed and/or utilized by the machine, in the form of a code, program and/or other directive. The fully shaped three-dimensional footwear upper data, when utilized with the V-bed knitting machine, ultimately can result in various features in the fully shaped three-dimensional footwear upper, such as: the predefined three-dimensional shape; the position, dimension and/or depth of a heel; the position of an apex and curve of the ankle; the length and location of an instep with eyelets; the position and dimension of various edges and calibration marks for sewing to the liner; the position and dimension of a toe box, also referred to as a front toe gather; the position and dimension the cushioning areas and/or lip edge of the ankle; the side to side lateral stiffness of the heel; the minimum width of the fully shaped three-dimensional footwear upper; the side to side curvature of the mid-foot, toe, medial arch, lateral side, and the like.

In some embodiments, user preference data, can be automatically combined with the fully shaped seamless three-dimensional footwear upper data by the V-bed knitting machine or a computer coupling system. The V-bed knitting machine or computer coupling system also automatically converts the user selection data into the form of a code or set of data codes to execute the user's desired modifications to the seamless three-dimensional upper computerized knitting program; the V-bed machine accesses the converted data code to create knitting production instructions, which are then accessed and implemented by the V-bed knitting machine to create one or more desired customized aesthetic variations and or customized functional variations of the original seamless three-dimensional upper.

The controller can access the fully shaped three-dimensional footwear upper production data to thereby control the V-bed knitting machine and produce a single unit or a strip of fully shaped three-dimensional footwear uppers, sequentially, in a desired number and configuration. Each of the fully shaped three-dimensional footwear uppers can include a substantially identical predefined three-dimensional shape, and can have virtually identical physical features, such as those enumerated above in connection with the fully shaped three-dimensional footwear upper data, or a series of varying three-dimensional uppers, from a production cue in the V-bed knitting machine's master computer and or a computer coupling system. Alternatively, when the machine is configured to produce only a single fully shaped three-dimensional footwear upper, the machine, as controlled by the controller, can utilize the first fully shaped three-dimensional footwear upper data to produce a fully shaped three-dimensional footwear upper having features that correspond to the first fully shaped three-dimensional footwear upper data.

In turn, a user can experiment with different fully shaped three-dimensional footwear upper profiles, sizes, and/or styles, and select one that best suits his or her preferences as described above. In addition, a particular preference profile of a user can be stored in a database. When the user wears out a footwear upper, the user can request an identical one to be reproduced by using the stored preference profile. This can enhance the comfort of the user. Also, the user need not go through extensive selection process to locate a fully shaped three-dimensional footwear upper that performs as desired. Instead, upon purchase of the new fully shaped three-dimensional footwear upper combination, the fully shaped three-dimensional footwear upper will consistently perform as expected.

According to the conventional art, when producing an individual unit or a connected strip of: cut and sew squares to die cut footwear uppers, two-dimensional shaped footwear uppers, or three dimensional semi-finished footwear uppers, the individual pieces or semi-finished uppers can be separated from one another in a variety of manners, all of which typically require a waste section to be knitted at the start of each individual unit or the connected strip of units, at the end and in between each individual unit and successive unit.

According to embodiments of the present disclosure, the method of manufacturing knitted fully shaped three-dimensional footwear uppers, the start, the bottom edge interface of the toe element and or ankle section is only a strand, or a couple strands of waste and a decoupling strand, which protect the finished bottom edge (e.g., at the toe or the ankle). In manufacturing an individual (single unit) fully shaped seamless three dimensional upper, the heel area has no edge interface and therefore no waste section.

For example, in manufacturing a daisy-chained strip of fully shaped three-dimensional uppers, the heel area has edge interface strand that protects the finished edge interface strand links up to the bottom edge ("toe") interface strands of the next fully shaped three-dimensional footwear upper. The two uppers are separated by a decoupling strand. This transition area can mimic or follow the curvature of the bottom edge ("toe") of a particular fully shaped three-dimensional upper as desired. Therefore, there is no waste fabric but only a few strands of waste per unit, which is less than 1% of the total weight of a fully shaped three-dimensional footwear upper.

In one example, the respective edges, for example heel to toe, can be joined with the edge interface strands in the form of a single pull stitch or strand. This pull stitch can be pulled by a machine or a human operator so that the respective edges separate from one another and/or the edge interface, thereby allowing one fully shaped three-dimensional footwear upper to be removed from or dissociated from another. Likewise, the edge can include one or more pull strands that can be pulled via a machine or human operator to separate the lower edge from the edge interface.

In some cases, where the lower edge ("toe") of one fully shaped three-dimensional footwear upper is joined directly with the upper edge ("heel") of another fully shaped three-dimensional footwear upper, a pull strand at the edge interface can be pulled to separate the second fully shaped three-dimensional footwear upper from the first fully shaped three-dimensional footwear upper.

Another manner of separating the fully shaped three-dimensional footwear uppers from the daisy-chained strip can include the use of a decoupling element. This decoupling element can decouple one fully shaped three-dimensional footwear upper from the next, for example, at the edge interface or respective edges of the fully shaped three-dimensional footwear uppers. The decoupling device can include shears, pressurized steam or other separating devices or mechanisms, which cuts, pulls, or melts the thermoplastic separation strands across the lower edge ("toe") of each fully shaped three-dimensional footwear upper. In so doing, those shears cut, the pressurized steam melts or evaporates off, the next adjacent and/or successive fully shaped three-dimensional footwear upper. The decoupling element can make multiple cuts, multiple pulls, or steaming traverses, one adjacent the upper edge ("heel") of each successive fully shaped three-dimensional footwear upper and/or adjacent the lower edge ("toe") of the each successive fully shaped three-dimensional footwear upper. In cases where the edge interface element is only a strand wide or a couple strands wide, the decoupler (e.g., 44 in FIG. 7B) can cut or steam melt across this edge interface, thereby separating the respective edges of the third and second fully shaped three-dimensional footwear uppers.

From there, the fully shaped three-dimensional footwear uppers can be dropped into a bin or other container for further processing on an individual basis. In some embodiments, a continuous strip of multiple fully shaped three-dimensional footwear uppers can be rolled on a spool and delivered to a manufacturer who can then mechanically or manually disassociate the individual footwear uppers from the daisy-chained strip.

Upon the decoupling of the individual fully shaped three-dimensional footwear, each of the fully shaped three-dimensional footwear uppers substantially retains its predefined three-dimensional shape. For example, even upon decoupling, the individual uppers will retain the concavity of the concave shape and/or contour of the toe, mid-foot, instep, ankle and heel. Retaining its shape assures that the fully shaped three-dimensional footwear upper fits consistently onto the last, into other post-processing tools in the case of fiber-reinforced-polymer materials, and into sewing equipment that is required for manufacturing the finished article of footwear ("shoe") repeatedly and consistently.

The footwear uppers formed in a daisy-chained strip form (e.g., as shown in FIG. 9C) can have varying widths. For example, the machine can vary the widths of the fully shaped three-dimensional footwear uppers in the chain according to the corresponding shoe sizes. For example, the machine can mechanically manipulate strands to generate fully shaped three-dimensional footwear uppers along the strip that have a width at their outermost lateral boundaries of a large size shoe, perhaps a men's size 22. Although the maximum width is the width of the needle beds in the machine, typically size 22 in humans is generally the maximum width of the fully shaped three-dimensional footwear uppers' strip, and along its length there is no limit. This maximum width can correspond to the region of the fully shaped three-dimensional footwear uppers as measured across the instep at the widest part of the toe flexion. It also can be the maximum of width of any individual fully shaped three-dimensional footwear upper that is formed along the daisy-chained strip. The machine also can mechanically manipulate the strands and the overall width of the daisy chained strip so that the fully shaped three-dimensional footwear uppers daisy-chained strip includes a second width, which is less than the first width. The second width can correspond generally to the region of the fully shaped three-dimensional footwear uppers near the heel, heel tab and/or other rearward appendage.

By precisely knitting the daisy-chained strip in the respective fully shaped three-dimensional footwear uppers therein, minimal waste is generated from the process. This is true even when the individual fully shaped three-dimensional footwear uppers and the daisy-chained strip width varies. According to the conventional art, without the knitting machine knitting a fully shaped three-dimensional footwear upper as a unit, or with the edge interface strand, the material that is knitted between the maximum width and the smaller width with off the shelf machine builder software and CAD would otherwise be removed and discarded as waste. Further, to remove this material would typically require additional machinery and/or human intervention or manipulation. With regard to durability, an upper formed entirely in one piece has no seam weakness or failure points.

With regard to comfort, an upper formed entirely in one piece has no seam irritation or pressure points.

In some embodiments, to impart other properties to the fully finished three-dimensionally knitted footwear, including durability, flex/recovery, and stretch-resistance, additional materials can be combined or integrated in the knitting process. The materials may be reflective, cut resistant, thermoplastic, insulating, adhesive, reinforcing, cushioning, aesthetic, and/or conductive, for example. Three-dimension knitting an upper to shape allows integrating specific materials into areas, the ability to transition seamlessly or blend the reinforcement, stretch or other specific performance features, into regions to: reinforce against abrasion or other forms of wear; provide seamless fit; create areas of dynamic stretch resistance and or limitation of other performance features; better secure the upper to the sole without potential seam failure points; and reduce waste of materials.

In some embodiments, a three-dimensional double-knit fabric insert (e.g., a supportive panel) is knitted on a four-needle bed machine and seamlessly inserted into, and or joins the facets of, another dimensional panel or component knitted in the same knitting process. The insert can be inserted at a greater angle than common short rowing, where that angle is a steep, right, and or an obtuse angle, such as the heel component described above to fit the anatomy of the foot. For production of a wide range of articles, a three-dimensional insert (as a supportive panel) can be knitted on a four-needle bed machine and seamlessly inserted into another dimensional panel knitted in the same knitting process. Examples of the articles include, but not limited to: footwear, socks, pants, shirts, jackets hats, gloves, as well as other articles. Other examples of articles include, but are not limited to: protective equipment such as shin guards, knee pads, elbow pads, shoulder pads, as well as any other type of protective equipment. Additionally, in some embodiments, the article could be another type of article including, but not limited to: bags (e.g., messenger bags, laptop bags, etc.), purses, duffel bags, backpacks, as well as other articles that may or may not be worn such as vehicle interior components, home or office seating, vehicle exterior panel constructions, architectural building panels, smart textiles for aerospace, and other applications.

While various embodiments have been described, the description is intended to be an example, rather than limiting, and it will be apparent to those of ordinary skill in the art that many more embodiments, configurations, and implementations are possible, and are within the scope of the embodiments. Accordingly, the embodiments are not to be restricted except in light of the attached claims and their equivalents. Also, various modifications and changes may be made within the scope of the attached claims.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of manufacturing footwear articles, the method comprising:
    knitting an upper in a knitting process using a knitting machine comprising a plurality of needle beds, the upper comprised of a plurality of portions;
    knitting an insert in the knitting process, the insert having loops;
    manipulating the insert in the knitting process;
    moving stitches for one of the plurality of portions from a first needle bed of the plurality of needle beds to a second needle bed of the knitting machine and subsequently attaching the loops of the insert to existing loops located on at least one of the plurality of portions of the upper; and
    attaching the upper with an outsole.

2. The method of claim 1, further comprising:
    joining integrated fiber reinforced components in the knitting process; and
    folding one or more of the integrated fiber reinforced components in or on top of a body portion of the plurality of portions of the upper.

3. The method of claim 2, further comprising:
    knitting an integrated sole component that is joined to a heel portion of the plurality of portions of the upper.

4. The method of claim 2, further comprising:
    knitting an attached insole comprised of an auxetic material that is attached to at least one of the plurality of portions of the upper.

5. The method of claim 2, further comprising:
    incorporating a monofilament or a thermal plastic strand that spans an instep portion of the plurality of portions of the upper and migrates to both a toe portion and a heel portion of the plurality of portions of the upper.

6. The method of claim 2, further comprising:
    knitting one or more upper attachments that are joined to at least one of the plurality of portions of the upper;
    folding the one or more upper attachments onto an upper surface of the upper and/or folding the one or more upper attachments into an interior of the upper; and
    securing the one or more upper attachments to the upper subsequent to the folding.

7. The method of claim 1, further comprising:
    obtaining one or more specialized materials that are wound on a spool;
    unwinding the one or more specialized materials from the spool without causing torque on the one or more specialized materials; and
    incorporating the one or more specialized materials into one or more portions of the plurality of portions of the upper through the knitting process.

8. The method of claim 7, wherein the incorporating of the one or more specialized materials comprises:
    using a first material strand of the one or more specialized materials having a first performance characteristic; and
    using a second material strand of the one or more specialized materials having a second performance characteristic that differs from the first performance characteristic to vary a particular mechanical, thermal, smart and/or elastic property within the one or more portions of the plurality of portions of the upper through the knitting process.

9. The method of claim 8, further comprising:
    interlooping the first material strand with the second material strand such that the one or portions of the plurality of portions of the upper formed through the knitting process comprises a combination of the first performance characteristic and the second performance characteristic.

10. The method of claim 7, wherein the knitting of the upper in the knitting process using the knitting machine further comprises:
    knitting the upper into a plurality of layers and stacking each of the plurality of layers with respect to one another; and
    varying a performance characteristic between each of the plurality of layers such that each layer comprises a specific performance and/or aesthetic characteristic.

11. The method of claim 10, further comprising:
    forming a pocket within at least one of the plurality of layers; and
    integrating an electronic device within the pocket of the upper such that the electronic device is capable of interacting with another layer of the plurality of layers.

12. The method of claim 11, further comprising:
    using a heat-resistant material for the forming of the pocket, thereby protecting the integrated electronic device during application of heat during post processes for the upper.

13. The method of claim 10, further comprising:
    knitting magnetic strands into a first one of the plurality of layers;
    knitting ferrofluid coated strands into a second one of the plurality of layers, the second one of the plurality of layers differing from the first one of the plurality of layers; and
    activating the magnetic strands and the ferrofluid coated strands such that the upper varies how the upper appears in a radar scan.

14. The method of claim 10, further comprising:
    knitting a first material used in construction of the upper to guide, absorb or reflect electro-magnetic waves.

15. The method of claim 1, wherein the knitting of the upper in the knitting process using the knitting machine may be controlled by a first set of computer instructions for execution by the knitting machine and the method further comprises:
    combining user preference data associated with desired modifications to the upper with the first set of computer instructions and generating a combined set of computer instructions that includes the user preference data for execution by the knitting machine; and
    executing the combined set of computer instructions for the knitting of the upper with the desired modifications to the upper.

16. The method of claim 15, wherein the executing of the combined set of computer instructions for the knitting of the upper with the desired modifications to the upper further comprises:
    varying an upper profile, an upper size, and/or an upper style as compared with the knitting of the upper using the first set of computer instructions.

17. The method of claim 16, wherein the executing of the combined set of computer instructions for the knitting of the upper with the desired modifications to the upper further comprises:
   knitting a series of uppers, with each of the uppers in the series of uppers being linked to one another with a strand.

18. The method of claim 17, wherein the knitting of the series of uppers further comprises:
   knitting a first upper in the series of uppers; and
   knitting a second upper in the series of uppers, the second upper comprising a customized aesthetic variation and/or a customized functional variation of the first upper.

19. The method of claim 15, further comprising:
   accessing the combined set of computer instructions; and
   providing an option to produce a single unit of the upper with the desired modifications to the upper or a strip of uppers with the desired modifications to the upper.

20. The method of claim 15, wherein the knitting of the upper with the desired modifications to the upper comprises:
   knitting the upper with a customized aesthetic variation and/or a customized functional variation as compared with the knitting of the upper using the first set of computer instructions.

* * * * *